(12) United States Patent
Kanso et al.

(10) Patent No.: US 11,956,266 B2
(45) Date of Patent: Apr. 9, 2024

(54) CONTEXT BASED RISK ASSESSMENT OF A COMPUTING RESOURCE VULNERABILITY

(71) Applicant: International Business Machines Corporation, Armonk, NY (US)

(72) Inventors: Ali Kanso, Stamford, CT (US); Muhammed Fatih Bulut, West Greenwich, RI (US); Jinho Hwang, Ossining, NY (US); Shripad Nadgowda, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 810 days.

(21) Appl. No.: 17/078,603

(22) Filed: Oct. 23, 2020

(65) Prior Publication Data
US 2022/0131888 A1    Apr. 28, 2022

(51) Int. Cl.
*H04L 9/00* (2022.01)
*H04L 9/40* (2022.01)

(52) U.S. Cl.
CPC ...... *H04L 63/1433* (2013.01); *H04L 63/1416* (2013.01); *H04L 63/20* (2013.01)

(58) Field of Classification Search
CPC .................. H04L 63/1433; H04L 63/1416
(Continued)

(56) References Cited

U.S. PATENT DOCUMENTS 7,552,480 B1   6/2009   Voss
9,092,616 B2   7/2015   Kumar et al.
(Continued)

FOREIGN PATENT DOCUMENTS

CN    111176804 A    5/2020
WO    2016020731    2/2016

OTHER PUBLICATIONS

Mell et al., "The NIST Definition of Cloud Computing," Recommendations of the National Institute of Standards and Technology, NIST Special Publication 800-145, Sep. 2011, 7 pages.
(Continued)

*Primary Examiner* — Christopher J Brown
(74) *Attorney, Agent, or Firm* — Amin, Turocy & Watson, LLP

(57) ABSTRACT

According to an embodiment, a computer-implemented method can comprise: inspecting, using a processor, a set of container images respectively associated with pods; identifying, using the processor, a first subset of the pods that contain a vulnerability; classifying, using the processor, the first subset of the pods as primary-infected pods; generating, using the processor, a first list of namespaces in which the primary-infected pods are deployed within a network; checking, using the processor, network policies in connection with the first list of namespaces to determine secondary-suspect pods that have ability to communicate with the primary-infected pods; generating, using the processor, a list of secondary-suspect namespaces in which the secondary-suspect pods are deployed within the network; identifying, using the processor, one or more secondary-suspect pods that communicated with one or more primary-infected pods; and generating, using the processor, a list of secondary-infected pods.

20 Claims, 17 Drawing Sheets

(58) Field of Classification Search
USPC .......................................................... 726/1
See application file for complete search history.

(56) References Cited

U.S. PATENT DOCUMENTS

| | | | |
|---|---|---|---|
| 10,527,437 | B2 | 1/2020 | Epperlein et al. |
| 10,824,726 | B1* | 11/2020 | Herman Saffar ..... G06F 21/566 |
| 2008/0201780 | A1 | 8/2008 | Khan et al. |
| 2013/0298244 | A1 | 11/2013 | Kumar et al. |
| 2015/0195299 | A1* | 7/2015 | Zoldi .................. H04L 63/1441 |
| | | | 726/25 |
| 2015/0237062 | A1 | 8/2015 | Roytman et al. |
| 2017/0228658 | A1 | 8/2017 | Lim |
| 2018/0046457 | A1 | 2/2018 | Branca |
| 2018/0139227 | A1 | 5/2018 | Martin et al. |
| 2018/0274927 | A1 | 9/2018 | Epperlein et al. |
| 2018/0288087 | A1* | 10/2018 | Hittel .................. H04L 63/1433 |
| 2020/0334362 | A1* | 10/2020 | Stoler .................. G06F 21/577 |

OTHER PUBLICATIONS

Alperin et al., "Risk Prioritization by Leveraging Latent Vulnerability Features in a Contested Environment," Session: Machine Learning for Security, Nov. 15, 2019, 10 pages.
"RS3, RiskSense Security Score," RiskSense, WhitePaper_RS$^3$_20190415, 2019, 13 pages.
"Skybox Vulnerability Control, Product Tour," Skybox Security, Skybox version 8.0.600, Revision 11, 2016, 57 pages.
Disclosed Anonymously, "Method and System for Automated Reasoning for Risk-Aware Resource Decommissioning," IP.com No. IPCOM000258150D, Apr. 12, 2019, 6 pages.
Disclosed Anonymously, "Method and system for redirecting traffic based on application and infrastructure risk," IP.com No. IPCOM000255222D, Sep. 11, 2018, 7 pages.
Disclosed Anonymously, "Vulnerability Risk Context Scoring Scheme," IP.cNOom No. IPCOM000232278D, Oct. 30, 013, 4 pages.
Shepherd, "With Kubernetes Operators comes great responsibility," Red Hat Blog, https://www.redhat.com/en/blog/kubernetes-operators-comes-great-responsibility, Mar. 30, 2020, 9 pages.
Mehta et al., "Ranking Attack Graphs," RAID 2006, LNCS 4219, pp. 127-144, 2006, 18 pages.
Sheyner et al., "Tools for Generating and Analyzing Attack Graphs," FMCO 2003, LNCS 3188, pp. 344-371, 2004, 28 pages.
Poolsappasit et al., "Dynamic Security Risk Management Using Bayesian Attack Graphs," IEEE Transactions on Dependable and Secure Computing, vol. 9, Issue 1, 2012, 15 pages.
Vijayakumar et al., "Automated risk identification using NLP in cloud based development environments," Journal of Ambient Intelligence and Humanized Computing, 2017, 13 pages.
Saripalli et al., "QUIRC: A Quantitative Impact and Risk Assessment Framework for Cloud Security," IEEE 3rd International Conference on Cloud Computing, 2010, 9 pages.
Goettelmann et al., "A Security Risk Assessment Model for Business Process Deployment in the Cloud," IEEE International Conference on Services Computing, Jun. 2014, 9 pages.
Albakri et al., "Security risk assessment framework for cloud computing environments," Security and Communication Networks, 2014, 11 pages.
"Kubernetes (K8s)," Production-Grade Container Orchestration, Automated container deployment, scaling, and management, https://kubernetes.io/, last accessed on Oct. 23, 2020, 6 pages.
"Common Vulnerabilities and Exposures (CVE)" https://cve.mitre.org/, last accessed on Oct. 23, 2020, 2 pages.
"Common Vulnerability Scoring System Calculator," CVSS Version 2, National Vulnerability Database, https://nvd.nist.gov/vuln-metrics/cvss/v2-calculator, last accessed on Oct. 23, 2020, 5 pages.
Burillo et al., "29 Docker security tools compared," Sysdig, https://sysdig.com/blog/20-docker-security-tools/, Nov. 8, 2018, 25 pages.
"Container Compliance with Sysdig Secure," Sysdig, https://sysdig.com/products/kubernetes-security/container-compliance/, last accessed on Oct. 23, 2020, 11 pages.
"Using the Strength of Cloud Native to Make Security Better," Twistlock, https://www.twistlock.com/cloud-native-security-lp/, last accessed on Oct. 23, 2020, 4 pages.
"Red Hat OpenShift 4, Innovation without limitation," https://www.openshift.com/, last accessed on Oct. 23, 2020, 5 pages.
"Vulnerability Advisor," IBM, https://cloud.ibm.com/docs/Registry?topic=va-va_index, last accessed on Oct. 23, 2020, 10 pages.
International Search Report and Written Opinion received for PCT Application Serial No. PCT/CN2021/125739 dated Jan. 20, 2022, 10 pages.

* cited by examiner

- A vulnerable pod, may have the ability to morph the system configuration to its advantage.
- By removing the security controls, its Risk can be significantly increased.

US 11,956,266 B2

CONTEXT BASED RISK ASSESSMENT OF A COMPUTING RESOURCE VULNERABILITY

BACKGROUND

The subject disclosure relates to risk assessment of a computer resource vulnerability, and more specifically, to context based risk assessment of a computer resource vulnerability.

Cloud computing applications (e.g., cloud native applications) may include known vulnerabilities, either in their source code (e.g., through libraries they include) or in their environment (e.g., through other software that they are packed with in the same virtual machine (VM) or application container). Cloud native applications are typically packaged in application containers (also referred to as "containers") and managed by a container clustering and orchestration middleware such as Kubernetes (K8s). A typical example of a vulnerable container is one that has a secure shell (SSH) release installed with a known vulnerability.

Common Vulnerabilities and Exposures (CVE) is a dictionary-type list of standardized names for computing resource vulnerabilities and other information related to security exposures. CVE aims to standardize the names for all publicly known computing resource vulnerabilities and security exposures. CVE also assigns a score for each vulnerability depending on its severity and how much damage an attacker entity can cause after the exploit of a vulnerability.

Some existing security technologies use the CVE score (e.g., where a lower CVE score=less risky) and/or attack graphs to assess the risk of a detected computing resource vulnerability in a network. However, a problem with such existing security technologies that use attack graphs to assess the risk of a detected computing resource vulnerability is that they only consider the networking elements capable of mitigating an attack (e.g., a cyberattack). Another problem with such existing security technologies is that they do not take into account the deployment context of a vulnerable computing resource (e.g., a vulnerable container, VM, and/or another vulnerable computing resource) when assessing the risk and/or the potential damage that a detected computing resource vulnerability can cause to one or more other computing resources.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate context based risk assessment of a computer resource vulnerability are described.

According to an embodiment, a system can comprise a processor that executes the following computer-executable components stored in a non-transitory computer readable medium: an inspection component that inspects a set of container images respectively associated with pods, identifies a first subset of the pods that contain a vulnerability, and classifies the first subset of the pods as primary-infected pods; a namespace component that generates a first list of namespaces in which the primary-infected pods are deployed within a network; and a network component that checks network policies in connection with the first list of namespaces to determine secondary-suspect pods that have ability to communicate with the primary-infected pods, wherein the namespace component generates a list of secondary-suspect namespaces in which the secondary-suspect pods are deployed within the network, the network component identifies one or more secondary-suspect pods that communicated with one or more primary-infected pods, and wherein the inspection component generates a list of secondary-infected pods. An advantage of such a system is that it can protect one or more computing resources in the network.

In some embodiments, the computer-executable components further comprise a check component that checks specification and privileges associated with the primary-infected pods and the secondary-infected pods to generate a list of suspect machines, primary-infected machines, and secondary-infected machines. An advantage of such a system is that it can protect one or more computing resources in the network.

According to another embodiment, a computer-implemented method can comprise inspecting, using a processor, a set of container images respectively associated with pods. The computer-implemented method can further comprise identifying, using the processor, a first subset of the pods that contain a vulnerability. The computer-implemented method can further comprise classifying, using the processor, the first subset of the pods as primary-infected pods. The computer-implemented method can further comprise generating, using the processor, a first list of namespaces in which the primary-infected pods are deployed within a network. The computer-implemented method can further comprise checking, using the processor, network policies in connection with the first list of namespaces to determine secondary-suspect pods that have ability to communicate with the primary-infected pods. The computer-implemented method can further comprise generating, using the processor, a list of secondary-suspect namespaces in which the secondary-suspect pods are deployed within the network. The computer-implemented method can further comprise identifying, using the processor, one or more secondary-suspect pods that communicated with one or more primary-infected pods. The computer-implemented method can further comprise generating, using the processor, a list of secondary-infected pods. An advantage of such a computer-implemented method is that it can be implemented to protect one or more computing resources in the network.

In some embodiments, the above computer-implemented method can further comprise checking, using the processor, specification and privileges associated with the primary-infected pods and the secondary-infected pods, and generating, using the processor, a list of suspect machines, primary-infected machines, and secondary-infected machines. An advantage of such a computer-implemented method is that it can be implemented to protect one or more computing resources in the network.

According to another embodiment, a computer program product comprising a computer readable storage medium having program instructions embodied therewith, the program instructions executable by a processor to cause the processor to inspect a set of container images respectively associated with pods. The program instructions are further executable by the processor to cause the processor to identify a first subset of the pods that contain a vulnerability. The program instructions are further executable by the processor to cause the processor to classify the first subset of the pods as primary-infected pods. The program instructions are further executable by the processor to cause the processor to generate a first list of namespaces in which the primary-infected pods are deployed within a network. The program instructions are further executable by the processor to cause the processor to check network policies in connection with the first list of namespaces to determine secondary-suspect pods that have ability to communicate with the primary-infected pods. The program instructions are further executable by the processor to cause the processor to generate a list of secondary-suspect namespaces in which the secondary-suspect pods are deployed within the network. The program instructions are further executable by the processor to cause the processor to identify one or more secondary-suspect pods that communicated with one or more primary-infected pods. The program instructions are further executable by the processor to cause the processor to generate a list of secondary-infected pods. An advantage of such a computer program product is that it can be implemented to protect one or more computing resources in the network.

In some embodiments, the program instructions are further executable by the processor to cause the processor to check specification and privileges associated with the primary-infected pods and the secondary-infected pods, and generate a list of suspect machines, primary-infected machines, and secondary-infected machines. An advantage of such a computer program product is that it can be implemented to protect one or more computing resources in the network.

DETAILED DESCRIPTION

Figure 1:
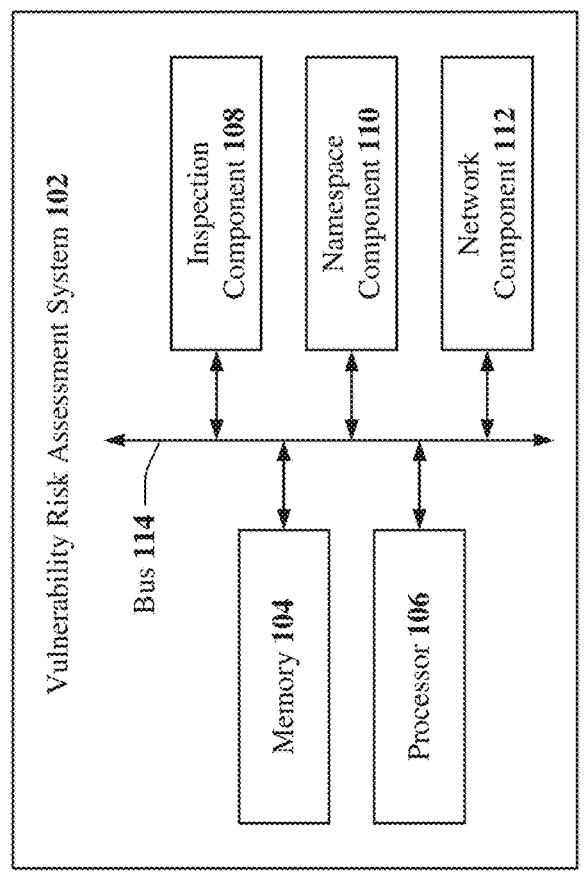
FIGS. 1, 2, 4, 5, 6, 8, and 9 illustrate block diagrams of example, non-limiting systems that can facilitate context based risk assessment of a computer resource vulnerability in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems described above with existing security techniques, the present disclosure can be implemented to produce a solution to these problems in the form of systems, computer-implemented methods, and/or computer program products that can facilitate context based risk assessment of a computer resource vulnerability by: inspecting a set of container images respectively associated with pods; identifying a first subset of the pods that contain a vulnerability; classifying the first subset of the pods as primary-infected pods; generating a first list of namespaces in which the primary-infected pods are deployed within a network; checking network policies in connection with the first list of namespaces to determine secondary-suspect pods that have ability to communicate with the primary-infected pods; generating a list of secondary-suspect namespaces in which the secondary-suspect pods are deployed within the network; identifying one or more secondary-suspect pods that communicated with one or more primary-infected pods; and generating a list of secondary-infected pods. An advantage of such systems, computer-implemented methods, and/or computer program products is that they can be implemented to protect one or more computing resources in the network.

In some embodiments, the present disclosure can be implemented to produce a solution to the problems described above in the form of systems, computer-implemented methods, and/or computer program products that can further facilitate context based risk assessment of a computer resource vulnerability by: checking specification and privileges associated with the primary-infected pods and the secondary-infected pods, and generating a list of suspect machines, primary-infected machines, and secondary-infected machines. An advantage of such systems, computer-implemented methods, and/or computer program products is that they can be implemented to protect one or more computing resources in the network.

As referenced herein, an "entity" can comprise a human, a client, a user, a computing device, a software application, an agent, a machine learning (ML) model, an artificial intelligence (AI) model, and/or another entity. As referenced herein, an "attacker entity" can comprise an entity as defined above that can exploit a vulnerability of a computing resource (e.g., a computing software and/or hardware resource) to attack (e.g., cyberattack) the computing resource using one or more attack techniques. As referenced herein, a "vulnerability" or a "computing resource vulnerability" can comprise, for example, a library that is known to have security issues, a configuration problem within a computing resource that can allow an attacker entity to attack the computing resource, and/or another vulnerability of a computing resource. As referenced herein, an "attack technique" can comprise a cyberattack technique. As referenced herein, a "security entity" and/or a "security analyst entity" can comprise an entity as defined above that can generate, develop, and/or implement one or more security measures (e.g., a threat model, vulnerability management model, a risk management model, penetration test, and/or another security measure) to prevent and/or mitigate exploitation of a computing resource vulnerability and/or an attack on the computing resource.

Figure 2:
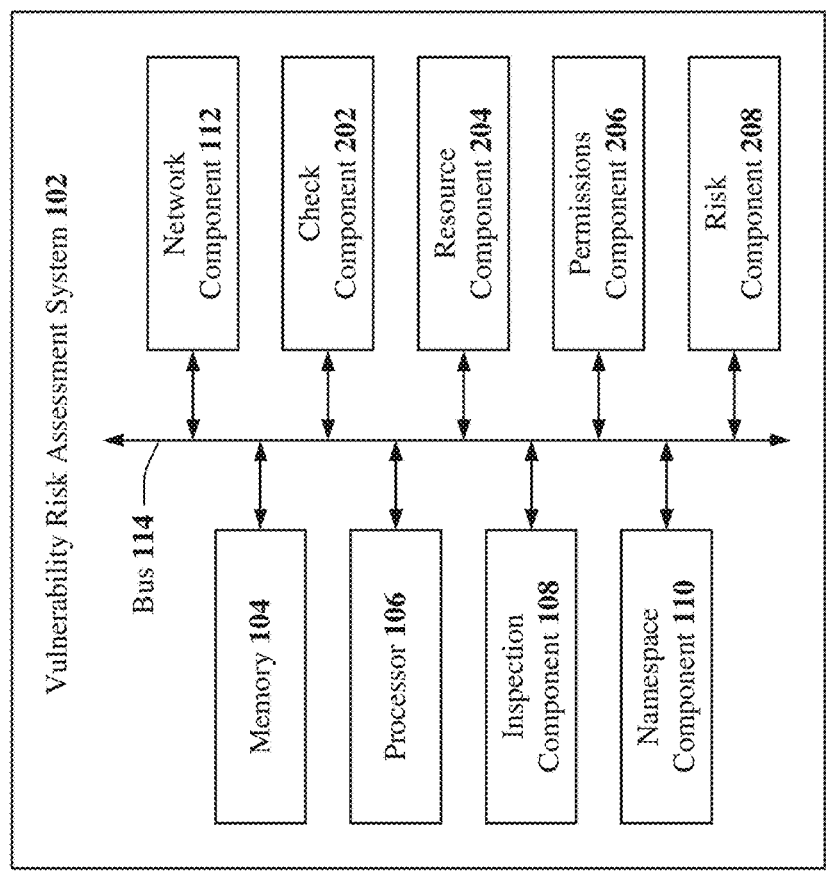

FIGS. 1 and 2 illustrate block diagrams of example, non-limiting systems 100 and 200, respectively, that can each facilitate context based risk assessment of a computer resource vulnerability in accordance with one or more embodiments described herein. System 100 and 200 can each comprise a vulnerability risk assessment system 102. Vulnerability risk assessment system 102 of system 100 depicted in FIG. 1 can comprise a memory 104, a processor 106, an inspection component 108, a namespace component 110, a network component 112, and/or a bus 114. Vulnerability risk assessment system 102 of system 200 depicted in FIG. 2 can further comprise a check component 202, a resource component 204, a permissions component 206, and/or a risk component 208.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100, system 200, and/or vulnerability risk assessment system 102 can further comprise various computer and/or computing-based elements described herein with reference to operating environment 1500 and FIG. 15. In several embodiments, such computer and/or computing-based elements can be used in connection with implementing one or more of the systems, devices, components, and/or computer-implemented operations shown and described in connection with FIG. 1, FIG. 2, and/or other figures disclosed herein.

Memory 104 can store one or more computer and/or machine readable, writable, and/or executable components and/or instructions that, when executed by processor 106 (e.g., a classical processor, a quantum processor, and/or another type of processor), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to vulnerability risk assessment system 102, inspection component 108, namespace component 110, network component 112, check component 202, resource component 204, permissions component 206, risk component 208, and/or another component associated with vulnerability risk assessment system 102 as described herein with or without reference to the various figures of the subject disclosure.

Memory 104 can comprise volatile memory (e.g., random access memory (RAM), static RAM (SRAM), dynamic RAM (DRAM), and/or another type of volatile memory) and/or non-volatile memory (e.g., read only memory (ROM), programmable ROM (PROM), electrically programmable ROM (EPROM), electrically erasable programmable ROM (EEPROM), and/or another type of non-volatile memory) that can employ one or more memory architectures. Further examples of memory 104 are described below with reference to system memory 1516 and FIG. 15. Such examples of memory 104 can be employed to implement any embodiments of the subject disclosure.

Processor 106 can comprise one or more types of processors and/or electronic circuitry (e.g., a classical processor, a quantum processor, and/or another type of processor and/or electronic circuitry) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 1514 and FIG. 15. Such examples of processor 106 can be employed to implement any embodiments of the subject disclosure.

Vulnerability risk assessment system 102, memory 104, processor 106, inspection component 108, namespace component 110, network component 112, check component 202, resource component 204, permissions component 206, risk component 208, and/or another component of vulnerability risk assessment system 102 as described herein can be communicatively, electrically, operatively, and/or optically coupled to one another via a bus 114 to perform functions of system 100, system 200, vulnerability risk assessment system 102, and/or any components coupled therewith. Bus 114 can comprise one or more memory bus, memory controller, peripheral bus, external bus, local bus, a quantum bus, and/or another type of bus that can employ various bus architectures. Further examples of bus 114 are described below with reference to system bus 1518 and FIG. 15. Such examples of bus 114 can be employed to implement any embodiments of the subject disclosure.

Vulnerability risk assessment system 102 can comprise any type of component, machine, device, facility, apparatus, and/or instrument that comprises a processor and/or can be capable of effective and/or operative communication with a wired and/or wireless network. All such embodiments are envisioned. For example, vulnerability risk assessment system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Vulnerability risk assessment system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a wire and/or a cable. For example, vulnerability risk assessment system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a data cable including, but not limited to, a High-Definition Multimedia Interface (HDMI) cable, a recommended standard (RS) 232 cable, an Ethernet cable, and/or another data cable.

In some embodiments, vulnerability risk assessment system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) via a network. For example, such a network can comprise wired and/or wireless networks, including, but not limited to, a cellular network, a wide area network (WAN) (e.g., the Internet) or a local area network (LAN). Vulnerability risk assessment system 102 can communicate with one or more external systems, sources, and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. Therefore, in some embodiments, vulnerability risk assessment system 102 can comprise hardware (e.g., a central processing unit (CPU), a transceiver, a decoder, quantum hardware, a quantum processor, and/or other hardware), software (e.g., a set of threads, a set of processes, software in execution, quantum pulse schedule, quantum circuit, quantum gates, and/or other software) or a combination of hardware and software that can facilitate communicating information between vulnerability risk assessment system 102 and external systems, sources, and/or devices (e.g., computing devices, communication devices, and/or another type of external system, source, and/or device).

Vulnerability risk assessment system 102 can comprise one or more computer and/or machine readable, writable, and/or executable components and/or instructions that, when executed by processor 106 (e.g., a classical processor, a quantum processor, and/or another type of processor), can facilitate performance of operations defined by such component(s) and/or instruction(s). Further, in numerous embodiments, any component associated with vulnerability risk assessment system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, inspection component 108, namespace component 110, network component 112, check component 202, resource component 204, permissions component 206, risk component 208, and/or any other components associated with vulnerability risk assessment system 102 as disclosed herein (e.g., communicatively, electronically, operatively, and/or optically coupled with and/or employed by vulnerability risk assessment system 102), can comprise such computer and/or machine readable, writable, and/or executable component(s) and/or instruction(s). Consequently, according to numerous embodiments, vulnerability risk assessment system 102 and/or any components associated therewith as disclosed herein, can employ processor 106 to execute such computer and/or machine readable, writable, and/or executable component(s) and/or instruction(s) to facilitate performance of one or more operations described herein with reference to vulnerability risk assessment system 102 and/or any such components associated therewith.

Vulnerability risk assessment system 102 can facilitate (e.g., via processor 106) performance of operations executed by and/or associated with inspection component 108, namespace component 110, network component 112, check component 202, resource component 204, permissions component 206, risk component 208, and/or another component associated with vulnerability risk assessment system 102 as disclosed herein. For example, as described in detail below, vulnerability risk assessment system 102 can facilitate (e.g., via processor 106): inspecting a set of container images respectively associated with pods; identifying a first subset of the pods that contain a vulnerability; classifying the first subset of the pods as primary-infected pods; generating a first list of namespaces in which the primary-infected pods are deployed within a network; checking network policies in connection with the first list of namespaces to determine secondary-suspect pods that have ability to communicate with the primary-infected pods; generating a list of secondary-suspect namespaces in which the secondary-suspect pods are deployed within the network; identifying one or more secondary-suspect pods that communicated with one or more primary-infected pods; and/or generating a list of secondary-infected pods.

In another example, as described in detail below, vulnerability risk assessment system 102 can further facilitate (e.g., via processor 106): checking specification and privileges associated with the primary-infected pods and the secondary-infected pods, and generating a list of suspect machines, primary-infected machines, and secondary-infected machines; determining total resource capacity that respective infected containers associated with the primary-infected pods and the secondary-infected pods have ability to consume, and generating a total-capacity-at-risk measure; determining permissions associated with the respective infected containers; generating a contextual risk score and an absolute risk score associated with the primary-infected pods and the secondary-infected pods; assessing bounded capacity of at least one of: processor, memory, or disk; and/or generating a contextual risk score and an absolute risk score associated with the primary-infected pods and the secondary-infected pods, and generating a second contextual risk score and a second absolute risk score associated with the primary-infected pods and the secondary-infected pods based on one or more changes.

In facilitating the above described operations, it should be appreciated that vulnerability risk assessment system 102 can thereby contextualize the risk of a computing resource vulnerability by going beyond the risk score provided by third party assessments such as the CVE and by going beyond the use of attack graphs that only consider the networking elements capable of mitigating an attack. For example, to contextualize the risk of a computing resource vulnerability, vulnerability risk assessment system 102 can determine the ability of the computing resource to morph a network and/or system configuration to its advantage by removing the firewalls and security rules that isolate the computing resource and limit its ability to inflict damage (e.g., via a cyberattack by an attacker entity). In another example, to contextualize the risk of a computing resource vulnerability, vulnerability risk assessment system 102 can determine the permissions that a vulnerable computing resource has on a network such as, for instance, a cloud computing management system, and can further check the ability of the vulnerable computing resource to create, delete, and/or modify the system defense-elements (e.g., Network Policies, Pod Security Policies, Resource Quota, and/or another system defense-element). In another example, to contextualize the risk of a computing resource vulnerability, vulnerability risk assessment system 102 can determine the ability of the vulnerable computing resource to escalate its privileges and access (e.g., the ability to add network routes, change domain name system (DNS) entries, and/or another technique to escalate its privileges and access).

In the above examples, by determining both the defense-elements in place that are capable of isolating the vulnerable computing resource and the ability of the vulnerable computing resource to modify those elements and extend its reach, vulnerability risk assessment system 102 can calculate a more accurate risk score (e.g., more accurate when compared to the CVE score). For example, based on examining all the full potentials on the vulnerable computing resource as described in the examples above, vulnerability risk assessment system 102 can further examine its dependencies. For instance, vulnerability risk assessment system 102 can further examine: the number of replicas of a vulnerable computing resource (e.g., the number of container images); the mitigation mechanisms that cannot be altered by the vulnerable computing resource; the communication pattern of the vulnerable computing resource with other computing resources in a network; and/or examine the capability of the unchangeable mechanism to mitigate the risk of the vulnerable computing resource. In these examples, based on the totality of all such analysis described above, vulnerability risk assessment system 102 can further calculate a contextual risk score (e.g., a context based risk score) and/or an absolute risk score corresponding to the computing resource vulnerability.

In some embodiments, vulnerability risk assessment system 102 can contextualize the risk of a vulnerable container in a network such as, for instance, a cloud computing environment (e.g., cloud computing environment 1650). To contextualize the risk of a vulnerable container in a cloud computing environment, vulnerability risk assessment system 102 can employ inspection component 108, namespace component 110, network component 112, check component 202, resource component 204, permissions component 206, and/or risk component 208 to perform the following operations: 1) determine the primary and secondary impacted containers; 2) determine the primary and secondary impacted machines; 3) determine the total resource that can be consumed by the infected pods; 4) determine the impacted containers permissions within the API server; and 5) determine the contextual risk and the absolute risk of the vulnerability.

1) Determine the Primary and Secondary Impacted Containers

Inspection component 108 can inspect a set of container images respectively associated with pods, identify a first subset of the pods that contain a vulnerability, and classify the first subset of the pods as primary-infected pods. For example, inspection component 108 can determine the total number of containers that have a given vulnerability (e.g., using the National Vulnerability Database (NVD), knowledge bases, security reports, blogs, and/or another resource). In this example, for each pod being evaluated, inspection component 108 can further check the container image and determine if it contains the vulnerability. In this example, inspection component 108 can further generate a list of primary-infected pods that can comprise the above described first subset of pods that contain the vulnerability (e.g., that contain an image of the vulnerable container).

Namespace component 110 can determine the namespaces in which the primary-infected pods are deployed within the cloud computing environment and can further generate a first list of such namespaces in which the primary-infected pods are deployed within the cloud computing environment. Network component 112 can check network policies in connection with the first list of namespaces to determine secondary-suspect pods that have ability to communicate with the primary-infected pods and can further generate a list of such secondary-suspect pods (e.g., pods that do not have the vulnerability but can be reached by those that have). Namespace component 110 can use the list of such secondary-suspect pods to determine secondary-suspect namespaces in which the secondary-suspect pods are deployed within the cloud computing environment and can further generate a list of such secondary-suspect namespaces. In some embodiments, namespace component 110 can exclude from such a list the first list of namespaces where the primary-infected pods are deployed. Network component 112 can use the list of secondary-suspect namespaces to examine the network communication log (e.g., using a data-network packet analyzer application such as, for instance, tcpdump and/or another data-network packet analyzer application) and identify one or more secondary-suspect pods that communicated with one or more primary-infected pods. In some embodiments, inspection component 108 can examine the secondary-suspect namespaces in which such one or more secondary-suspect pods are deployed within the cloud computing environment and further deduce and/or generate from the list of secondary-suspect namespaces a list of secondary-infected namespaces and/or a list of secondary-infected pods. It should be appreciated that inspection component 108, namespace component 110, and network component 112 can repeat the above described steps to derive more levels of infected pods, infected namespaces, suspect pods, and/or suspect namespaces beyond the secondary level described above.

2) Determine the Primary and Secondary Impacted Machines

A pod with a vulnerable container can impact a computing resource in the cloud computing environment (e.g., a virtual machine) if the vulnerable container is not properly secured. A secured container is one that is running without escalated privileges and is bounded by system policies.

Check component 202 can check specification and privileges associated with each of the primary-infected pods and each of the secondary-infected pods to generate a list of suspect machines, primary-infected machines, and secondary-infected machines (e.g., where such machines can comprise virtual machines). For example, check component 202 can check the pod specification and privileges associated with each of the primary-infected pods and each of the secondary-infected pods and can further check system policies of machines (e.g., virtual machines) associated with such pods to generate such a list of suspect machines, primary-infected machines, and secondary-infected machines. For instance, check component 202 can determine that a certain machine is a suspect machine if it has a suspect pod and it lacks system policies that properly secure it. In another example, check component 202 can determine that a certain machine is a primary-infected machine if it has a primary-infected pod and it lacks system policies that properly secure it. In another example, check component 202 can determine that a certain machine is a secondary-infected machine if it has a secondary-infected pod and it lacks system policies that properly secure it.

3) Determine the Total Resource that can be Consumed by the Infected Pods

Each pod can have a bounded capacity of a given computing resource such as, for example, processor (e.g., CPU), memory, disk, and/or another computing resource. These boundaries are usually enforced by features such as, for instance, cgroups. A container that exceeds its memory limits can be terminated by an out of memory manager (OOM). A typical security attack on a cloud computing environment is to cause an increase in the computation utilization thus causing the provider of the service to pay more for the infrastructure.

Resource component 204 can determine total resource capacity that respective infected containers associated with the primary-infected pods and the secondary-infected pods have ability to consume to generate a total-capacity-at-risk measure. For example, resource component 204 can calculate the total capacity for each computing resource that the infected containers in the primary and secondary-infected pods can consume. To calculate the total capacity for each computing resource that the infected containers in the primary and secondary-infected pods can consume, resource component 204 can assess bounded capacity of each of such computing resource. For instance, resource component 204 can assess bounded capacity of at least one of: processor, memory, or disk. Resource component 204 can perform the above described total capacity calculation based on the assumption that unbounded containers can consume the total machine capacity of a computing resource or the total computing resource itself (e.g., in the case of a remote disk not on the machine). In these examples, based on performing the above described total capacity calculation for each infected container in the primary and secondary-infected pods, resource component 204 can thereby produce a total-capacity-at-risk measure.

4) Determine the Impacted Containers Permissions within the API Server

In Kubernetes (K8s), each pod has a service-account mounted to it. This service-account has certain permissions and authenticates the pod to communicate with the application programming interface API server (API-server) of K8s. If this service account is not bounded by role based access control (RBAC) or by attribute based access control (ABAC), or if it has an RBAC with admin permissions, then an attacker entity that gains access to such a pod, can cause problems by performing one or more actions such as, for instance, creating, deleting, and/or modifying pods, network policy, ingress rules, egress rules, and/or another feature.

Permissions component 206 can determine permissions associated with the respective infected containers. For example, permissions component 206 can determine the amount (e.g., the level) of API-server permissions an infected pod has in K8s. For instance, permissions component 206 can determine the amount of API-server permissions that a primary-infected pod, a secondary-infected pod, and/or a secondary-suspected pod has in K8s. To determine permissions associated with an infected container, permissions component 206 can examine one or more security context settings associated with the infected container. For example, in a K8s construct, permissions component 206 can examine the Discretionary Access Control associated with the infected container. In this example, permissions component 206 can examine the user ID (UID) and group ID (GID) associated with the infected container to determine the infected container's permissions related to accessing an object in K8s such as, for example, a file.

5) Determine the Contextual Risk and the Absolute Risk of the Vulnerability

Risk component 208 can generate a contextual risk score and an absolute risk score associated with the primary-infected pods and the secondary-infected pods. In some embodiments, risk component 208 can employ a rule-based technique to calculate such a contextual risk score and/or absolute risk score, where the rules of such a rule-based technique define values that can be assigned to various risks and/or security measures associated with the primary-infected pods and/or the secondary-infected pods. In an example, risk component 208 can combine the findings from operations 1)-4) described above to generate a contextual risk score. For instance, to generate a contextual risk score, risk component 208 can combine the findings from operations 1)-4) as outlined in Table 1 below, where "Cardinality x threat" denotes the number of elements measured in a certain group (e.g., the number of primary-infected pods determined by inspection component 108 as described above).

TABLE 1

| Measure | Score |
| --- | --- |
| Primary-infected pods | Cardinality x threat+ |
| Secondary-infected pods | Cardinality x threat+ |
| Secondary-suspect pods | Cardinality x threat+ |
| Primary-infected namespaces | Cardinality x threat+ |
| Secondary-infected namespaces | Cardinality x threat+ |
| Secondary-suspect namespaces | Cardinality x threat+ |
| Primary-infected machines | Cardinality x threat+ |
| Secondary-infected machines | Cardinality x threat+ |
| Suspect-machines | Cardinality x threat+ |
| Total-capacity-at-risk | Total x threat+ |
| Level-of-permissions on the API-server | Entity-defined-risk x threat |

Risk component 208 can further generate an absolute risk score by combining the contextual risk score that can be calculated using Table 1 with the absolute risk of the computing resource vulnerability. For example, risk component 208 can generate an absolute risk score by combining the contextual risk score that can be calculated using Table 1 with the CVE score of a computing resource vulnerability that can be obtained from a vulnerability data source (e.g., the National Vulnerability Database (NVD), knowledge bases, security reports, blogs, and/or another resource).

In some embodiments, risk component 208 can dynamically generate a second contextual risk score and/or a second absolute risk score associated with the primary-infected pods and the secondary-infected pods based on one or more changes. For example, risk component 208 can dynamically generate a second contextual risk score and/or a second absolute risk score associated with the primary-infected pods and the secondary-infected pods based on one or more changes including, but not limited to, a network policy change, a computing resource change, a configuration change, an infrastructure change, a security measure change, a permissions change, a privileges change, a specification change, a communication pattern change (e.g., between computing resources in a network), and/or another change that can occur with respect to one or more computing resources in a network and/or with respect to the network itself.

In some embodiments, risk component 208 can comprise and/or employ one or more machine learning (ML) and/or artificial intelligence (AI) models to generate the above described contextual risk score associated with the primary-infected pods and the secondary-infected pods. For example, risk component 208 can comprise and/or employ an ML and/or AI model that has been trained to learn the behavior of a network (e.g., a cloud computing environment) and how a particular computing resource vulnerability can affect the network and/or one or more computing resource components therein. For instance, risk component 208 can comprise and/or employ an ML and/or AI model that has been trained to learn, for example, the network infrastructure and configuration, the configuration of the computing resource components in the network, as well as how such components communicate, the security measures implemented with respect to such components, and/or how the network and the one or more components therein behave when various vulnerabilities are exploited in the network. In this example, based on obtaining (e.g., from the NVD) data describing a certain vulnerability associated with one or more computing resource components in the network, risk component 208 can comprise and/or employ such a trained ML and/or AI model to generate the above described contextual risk score associated with such computing resource component(s).

To facilitate the above described functions (e.g., learning how a particular computing resource vulnerability can affect a network and/or one or more computing resource components therein and calculating the above described contextual risk score), risk component 208 can comprise and/or employ an ML and/or AI model that can perform classifications, correlations, inferences, and/or expressions associated with principles of artificial intelligence. For instance, risk component 208 can comprise and/or employ an ML and/or AI model that can use an automatic classification system and/or an automatic classification. In one example, risk component 208 can comprise and/or employ an ML and/or AI model that can use a probabilistic and/or statistical-based analysis (e.g., factoring into the analysis utilities and costs) to learn and/or generate inferences. Risk component 208 can comprise and/or employ an ML and/or AI model that can use any suitable machine-learning based techniques, statistical-based techniques and/or probabilistic-based techniques. For example, risk component 208 can comprise and/or employ an ML and/or AI model that can use expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, risk component 208 can comprise and/or employ an ML and/or AI model that can perform a set of machine learning computations. For instance, risk component 208 can comprise and/or employ an ML and/or AI model that can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

In some embodiments, vulnerability risk assessment system 102 can be associated with a cloud computing environment. For example, vulnerability risk assessment system 102 can be associated with cloud computing environment 1650 described below with reference to FIG. 16 and/or one or more functional abstraction layers described below with reference to FIG. 17 (e.g., hardware and software layer 1760, virtualization layer 1770, management layer 1780, and/or workloads layer 1790).

Vulnerability risk assessment system 102 and/or components thereof (e.g., inspection component 108, namespace component 110, check component 202, resource component 204, permissions component 206, risk component 208, and/or another component) can employ one or more computing resources of cloud computing environment 1650 described below with reference to FIG. 16 and/or one or more functional abstraction layers (e.g., quantum software) described below with reference to FIG. 17 to execute one or more operations in accordance with one or more embodiments of the subject disclosure described herein. For example, cloud computing environment 1650 and/or such one or more functional abstraction layers can comprise one or more classical computing devices (e.g., classical computer, classical processor, virtual machine, server, and/or another classical computing device), quantum hardware, and/or quantum software (e.g., quantum computing device, quantum computer, quantum processor, quantum circuit simulation software, superconducting circuit, and/or other quantum hardware and/or quantum software) that can be employed by vulnerability risk assessment system 102 and/or components thereof to execute one or more operations in accordance with one or more embodiments of the subject disclosure described herein. For instance, vulnerability risk assessment system 102 and/or components thereof can employ such one or more classical and/or quantum computing resources to execute one or more classical and/or quantum: mathematical function, calculation, and/or equation; computing and/or processing script; algorithm; model (e.g., AI model, ML model, and/or another type of model); and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
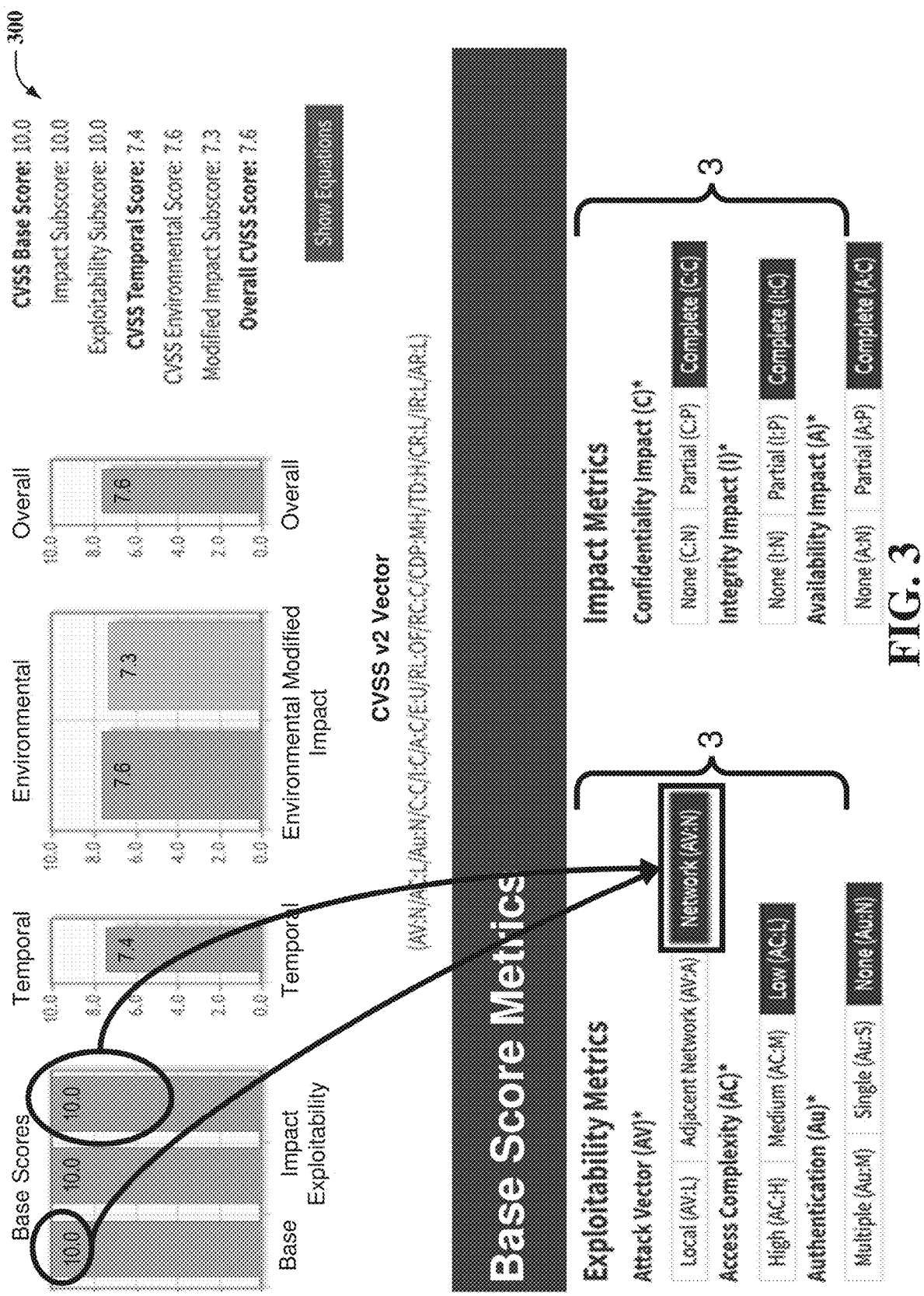
FIG. 3 illustrates an example, non-limiting diagram of a prior art system that generates common vulnerabilities and exposures (CVE) scores that can be used to facilitate context based risk assessment of a computer resource vulnerability in accordance with one or more embodiments described herein.

FIG. 3 illustrates an example, non-limiting diagram 300 of a prior art system that generates common vulnerabilities and exposures (CVE) scores that can be used to facilitate context based risk assessment of a computer resource vulnerability in accordance with one or more embodiments described herein. Repetitive description of like elements and/or processes employed in respective embodiments is omitted for sake of brevity.

Diagram 300 illustrates how a CVE score is calculated for a computing resource vulnerability, using several categories and/or metrics (e.g., base, impact exploitability, temporal, environmental modified impact, overall, exploitability metrics, impact metrics, and/or another category and/or metric). Diagram 300 illustrates how a CVE score can be calculated for a certain computing resource vulnerability within a network (denoted as "Network (AV:N)" in FIG. 3), where such a CVE score can be combined by risk component 208 with the above described contextual risk score to calculate the absolute risk score as described above with reference to the example embodiments depicted in FIGS. 1 and 2.

Figure 4:
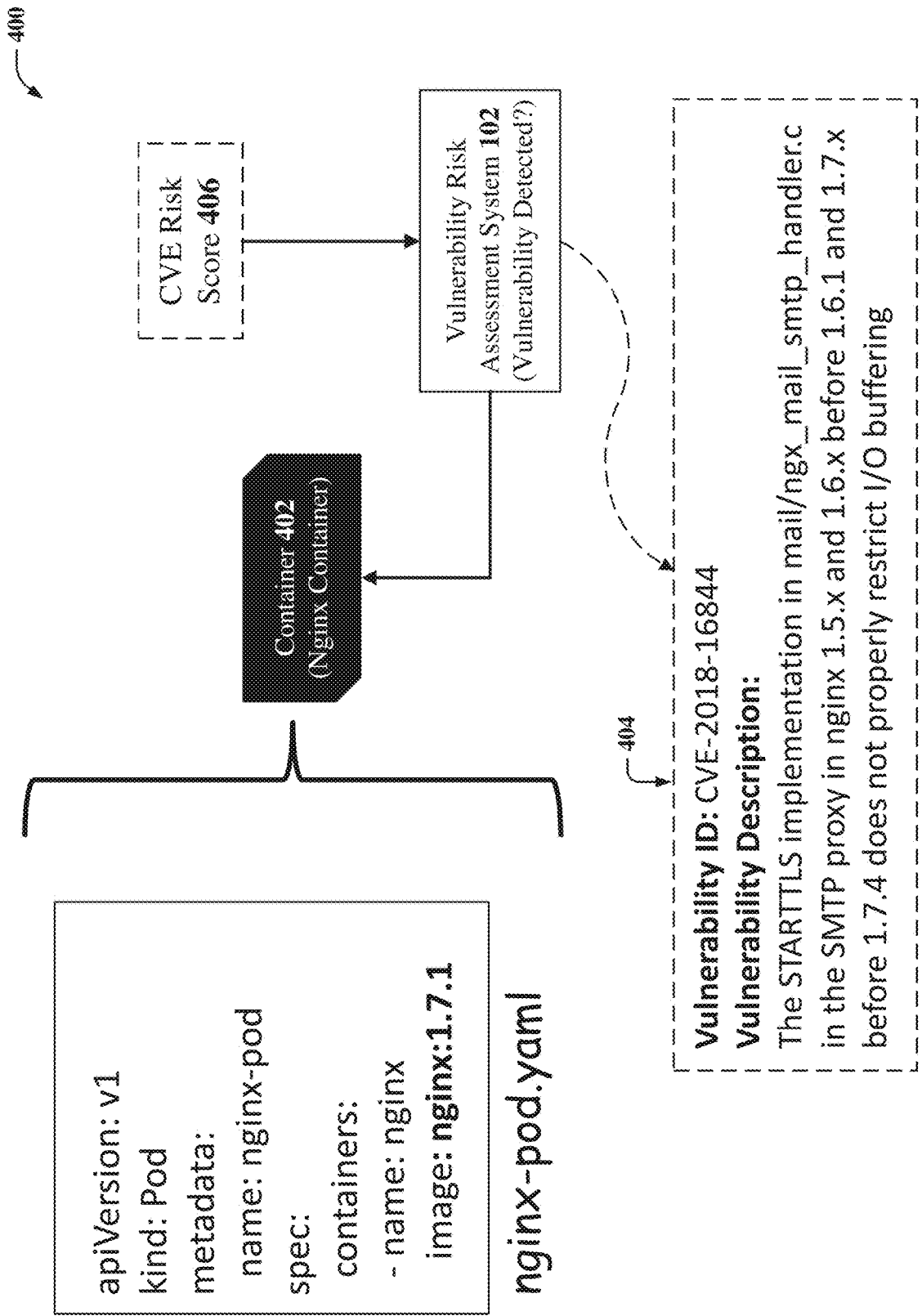

FIG. 4 illustrates a block diagram of an example, non-limiting system 400 that can facilitate context based risk assessment of a computer resource vulnerability in accordance with one or more embodiments described herein. Repetitive description of like elements and/or processes employed in respective embodiments is omitted for sake of brevity.

As illustrated in the example embodiment depicted in FIG. 4, system 400 can comprise vulnerability risk assessment system 102. In this example embodiment, inspection component 108 can: inspect an image (denoted as "nginx: 1.7.1" in FIG. 4) of a container 402 (denoted as "Nginx Container" in FIG. 4) in a pod (denoted as "nginx-pod" in FIG. 4); identify a vulnerability 404 (denoted as "CVE-2018-16844); and/or classify the pod as a primary-infected pod. In this example embodiment, based on identifying vulnerability 404, namespace component 110 can generate a list of namespaces (e.g., primary-infected namespaces) in which the primary-infected pod is deployed within a network. In this example embodiment, network component 112 can check network policies in connection with such namespaces to determine one or more secondary-suspect pods that have ability to communicate with the primary-infected pod. In this example embodiment, based on such determination by network component 112, namespace component 110 can generate a list of secondary-suspect namespaces in which the one or more secondary-suspect pods are deployed within the network. In this example embodiment, network component 112 can further identify one or more secondary-suspect pods that actually communicated with the primary-infected pod. In this example embodiment, inspection component 108 can designate such one or more secondary-suspect pods that actually communicated with the primary-infected pod as one or more secondary-infected pods. In this example embodiment, namespace component 110 can designate the namespaces in which such one or more secondary-suspect pods actually communicated with the primary-infected pod as secondary-infected namespaces.

In the example embodiment depicted in FIG. 4, check component 202 can check specification and privileges associated with the primary-infected pod and each of the one or more secondary-infected pods to generate a list of suspect machines, primary-infected machines, and secondary-infected machines (e.g., where such machines can comprise virtual machines). In this example embodiment, based on such a list of suspect machines, primary-infected machines, and secondary-infected machines, resource component 204 can determine total resource capacity that infected container 402 (e.g., and/or the infected container image denoted in FIG. 4 as "nginx:1.7.1") has ability to consume and generate a total-capacity-at-risk measure (e.g., total-capacity-at-risk measure corresponding to computing resources such as, for instance, processor, memory, or disk). In this example embodiment, permissions component 206 can determine permissions associated with infected container 402 to further determine contextual attack risk associated with container 402. For example, permissions component 206 can determine permissions associated with container 402 in a certain network such as, for instance, a cloud computing environment.

In the example embodiment illustrated in FIG. 4, based on the findings of all above described operations performed by various components of vulnerability risk assessment system 102, risk component 208 can generate a contextual risk score and an absolute risk score associated with the primary-infected pod and the secondary-infected pods. For example, risk component 208 can use the findings of all above described operations to generate a contextual risk score associated with the primary-infected pod and the secondary-infected pods by using Table 1 as described above with reference to the example embodiments depicted in FIGS. 1 and 2. In this example, risk component 208 can further combine such a contextual risk score with CVE risk score 406 corresponding to vulnerability 404 to calculate an absolute risk score associated with the primary-infected pod and the secondary-infected pods. In this example, vulnerability risk assessment system 102 and/or one or more components thereof can obtain CVE risk score 406 from a vulnerability data source (e.g., the National Vulnerability Database (NVD), knowledge bases, security reports, blogs, and/or another resource).

Figure 5:
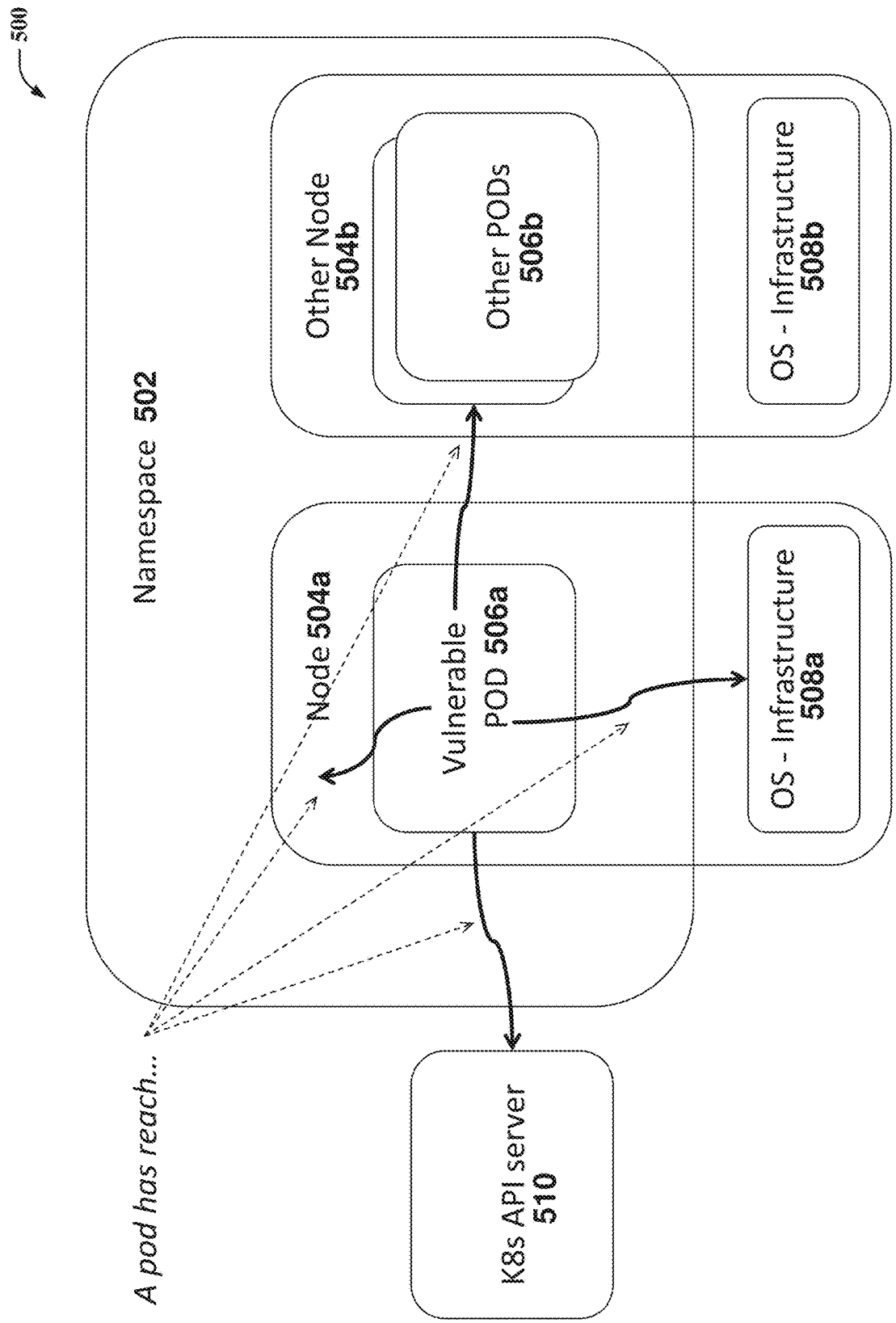

FIG. 5 illustrates a block diagram of an example, non-limiting system 500 that can facilitate context based risk assessment of a computer resource vulnerability in accordance with one or more embodiments described herein. Repetitive description of like elements and/or processes employed in respective embodiments is omitted for sake of brevity.

System 500 illustrates how a vulnerable pod can interact with (e.g., communicate) and/or be coupled (e.g., operatively, communicatively, electrically, optically, and/or coupled via another type of coupling) to one or more computing resources in a network (e.g., as annotated in FIG. 5 and represented visually by the black curved arrows in FIG. 5). In some embodiments, system 500 can comprise a Kubernetes (K8s) construct.

As illustrated in the example embodiment illustrated in FIG. 5, in a namespace 502, a vulnerable pod 506a can interact with and/or be coupled to a node 504a and/or an operating system infrastructure 508a (denoted as "OS—Infrastructure" in FIG. 5) of node 504a. In this example embodiment, vulnerable pod 506a can also interact with and/or be coupled to one or more other nodes 504b, one or more other pods 506b, and/or an operating system infrastructure 508b (denoted as "OS—Infrastructure" in FIG. 5) of such one or more other nodes 504b. In this example embodiment, vulnerable pod 506a can also interact with and/or be coupled to a server such as, for instance, K8s application programming interface (API) service 510 (referred to herein as K8s API server 510).

In accordance with one or more embodiments of the subject disclosure, vulnerability risk assessment system 102 (e.g., via network component 112, check component 202, permissions component 206, and/or another component) can determine one or more mitigation mechanisms associated with vulnerable pod 506a (e.g., by examining network policies, specifications and/or privileges associated with vulnerable pod 506a, permissions associated with vulnerable pod 506a, and/or another technique). In accordance with one or more embodiments of the subject disclosure, vulnerability risk assessment system 102 (e.g., via inspection component 108, namespace component 110, network component 112, permissions component 206, and/or another component) can determine other elements in communication with vulnerable pod 506a to determine whether the vulnerability of vulnerable pod 506a can affect other computing resource components in system 500. In accordance with one or more embodiments of the subject disclosure, vulnerability risk assessment system 102 (e.g., via risk component 208 and/or another component) can calculate a contextual risk score and an absolute risk score associated with vulnerable pod 506a based on, for example, a CVE score corresponding to the vulnerability of vulnerable pod 506a, the one or more mitigation mechanisms associated with vulnerable pod 506a, and whether the vulnerability of vulnerable pod 506a affects other components in system 500. For instance, risk component 208 can calculate such a contextual risk score using Table 1 as described above with reference to the example embodiments illustrated in FIGS. 1 and 2.

Figure 6:
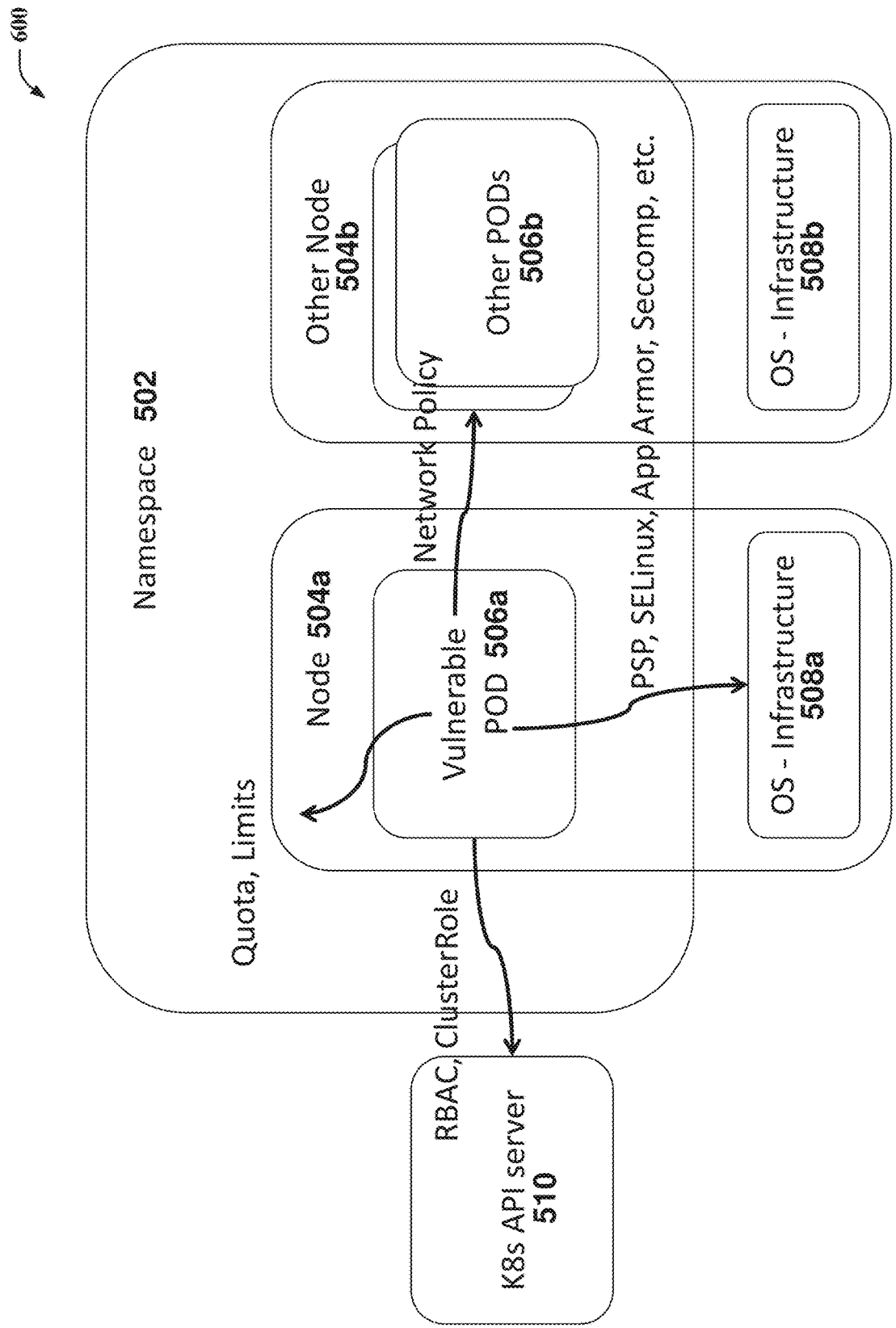

FIG. 6 illustrates a block diagram of an example, non-limiting system 600 that can facilitate context based risk assessment of a computer resource vulnerability in accordance with one or more embodiments described herein. Repetitive description of like elements and/or processes employed in respective embodiments is omitted for sake of brevity.

System 600 can comprise an example, non-limiting alternative embodiment of system 500, where system 600 illustrates one or more security measures (e.g., policies, privileges, permissions, specifications, and/or another security measure) that can be implemented in a network with respect to vulnerable pod 506a. In some embodiments, system 600 illustrates one or more security measures that can be implemented with respect to vulnerable pod 506a in a Kubernetes (K8s) construct.

As illustrated in the example embodiment depicted in FIG. 6, one or more security measures that can be implemented (e.g., in a K8s construct) with respect to vulnerable pod 506a can include, but are not limited to: Quota (e.g., resource quota to limit the aggregate resource consumption in namespace 502); Limits (e.g., resource limits to limit consumption of a specific resource); Network Policy (e.g., K8s network policy to specify how vulnerable pod 506a communicates with various network components); Pod Security Policy (PSP); Security Enhanced Linux (SELinux); AppArmor; Secure Computing Mode (Seccomp); Role-Based Access Control (RBAC); ClusterRole; and/or another security measure. In accordance with one or more embodiments of the subject disclosure, vulnerability risk assessment system 102 (e.g., via network component 112, check component 202, resource component 204, permissions component 206, risk component 208, and/or another component) can identify and account for such one or more security measures when calculating the above described contextual risk score and/or absolute risk score corresponding to vulnerable pod 506a. For example, vulnerability risk assessment system 102 (e.g., via network component 112, check component 202, resource component 204, permissions component 206, risk component 208, and/or another component) can identify and account for such one or more security measures when calculating the contextual risk score corresponding to vulnerable pod 506a using Table 1 as described above with reference to the example embodiments depicted in FIGS. 1 and 2.

Figure 7:
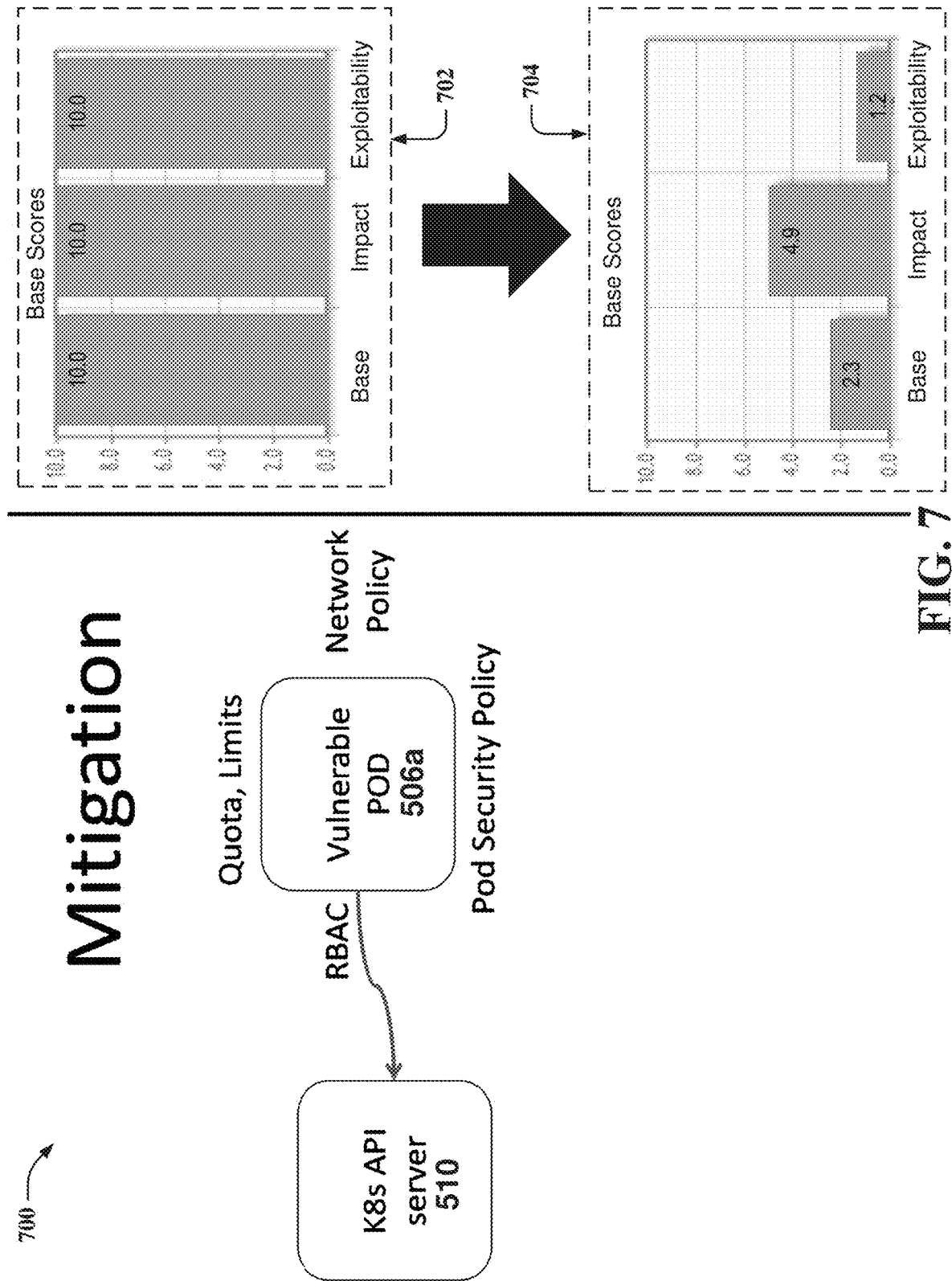
FIGS. 7, 10, 11, and 12 illustrate example, non-limiting diagrams that can facilitate context based risk assessment of a computer resource vulnerability in accordance with one or more embodiments described herein.

FIG. 7 illustrates an example, non-limiting diagram 700 that can facilitate context based risk assessment of a computer resource vulnerability in accordance with one or more embodiments described herein. Repetitive description of like elements and/or processes employed in respective embodiments is omitted for sake of brevity.

Diagram 700 illustrates how the implementation of one or more security measures described above with reference to FIG. 6 can mitigate the risk associated with vulnerable pod 506a. That is, for example, diagram 700 illustrates how the risk associated with vulnerable pod 506a (e.g., as defined by the CVE score) can actually be less when the context associated with vulnerable pod 506a is accounted for in a risk assessment (e.g., accounted for in a contextual based risk assessment that can be performed by vulnerability risk assessment system 102 in accordance with one or more embodiments of the subject disclosure).

In the example embodiment depicted in FIG. 7, base scores 702 can comprise baseline risk scores such as, for instance, the CVE scores corresponding to the vulnerability of vulnerable pod 506a. For example, base scores 702 can comprise baseline risk scores that can be calculated without accounting for context associated with vulnerable pod 506a. For instance, base scores 702 can comprise baseline risk scores that existing vulnerability risk assessment technologies calculate without accounting for context such as, for example, whether or not one or more of the above described security measures have been implemented with respect to vulnerable pod 506a.

In the example embodiment depicted in FIG. 7, base scores 704 can comprise context based risk scores corresponding to vulnerable pod 506a that do take into account context such as, for example, whether or not one or more of the above described security measures have been implemented with respect to vulnerable pod 506a. In this example embodiment, base scores 704 can comprise the contextual risk score and/or the absolute risk score corresponding to vulnerable pod 506a that can be calculated by vulnerability risk assessment system 102 (e.g., via risk component 208) as described above with reference to the example embodiments depicted in FIGS. 1 and 2. In this example embodiment, to calculate base scores 704, vulnerability risk assessment system 102 (e.g., via network component 112, check component 202, resource component 204, permissions component 206, risk component 208, and/or another component) can identify and account for the RBAC designation assigned to vulnerable pod 506a, as well as the Quota, Limits, Network Policy, and/or Pod Security Policy measures implemented with respect to vulnerable pod 506a. For instance, vulnerability risk assessment system 102 (e.g., via network component 112, check component 202, resource component 204, permissions component 206, risk component 208, and/or another component) can identify and account for the RBAC designation assigned to vulnerable pod 506a, as well as the Quota, Limits, Network Policy, and/or Pod Security Policy measures implemented with respect to vulnerable pod 506a when calculating the contextual risk score corresponding to vulnerable pod 506a using Table 1 as described above with reference to the example embodiments depicted in FIGS. 1 and 2.

In the example embodiment depicted in FIG. 7, it should be appreciated that vulnerability risk assessment system 102 can facilitate an improved risk assessment of vulnerable pod 506a by accounting for context associated with vulnerable pod 506a. For example, it should be appreciated that vulnerability risk assessment system 102 can facilitate an improved risk assessment of vulnerable pod 506a by accounting for one or more security measures that have or have not been implemented with respect to vulnerable pod 506a (e.g., whether or not a Quota, Limits, Network Policy, Pod Security Policy, and/or an RBAC have been implemented with respect to vulnerable pod 506a as illustrated in FIG. 7). As illustrated in the example embodiment depicted in FIG. 7, it should be appreciated that base scores 704 provide a more accurate risk assessment of the risk associated with vulnerable pod 506a, as vulnerability risk assessment system 102 can account for the presence of the RBAC designation assigned to vulnerable pod 506a, as well as the Quota, Limits, Network Policy, and/or Pod Security Policy measures implemented with respect to vulnerable pod 506a when calculating base scores 704.

Figure 8:
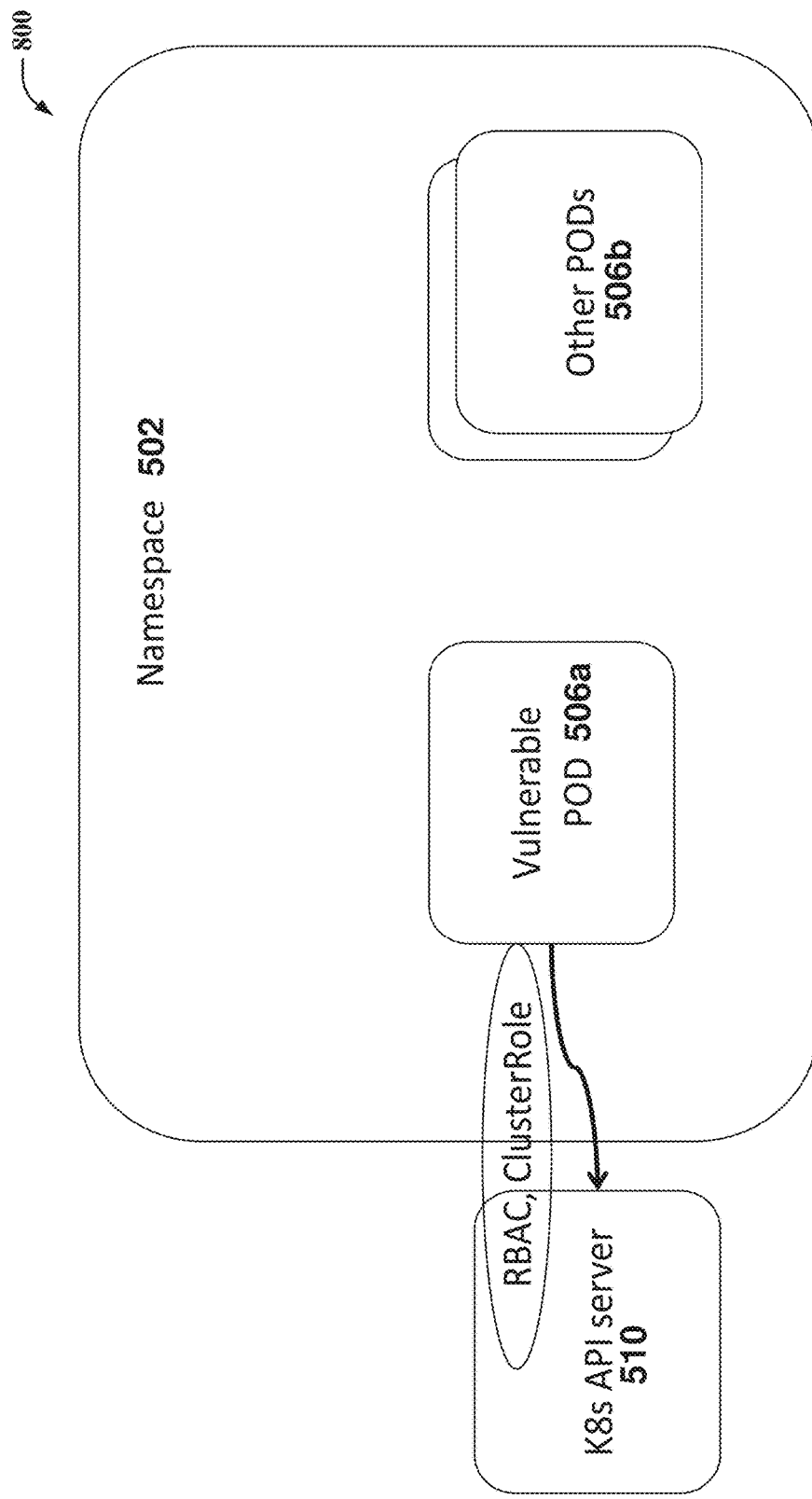

FIG. 8 illustrates a block diagram of an example, non-limiting system 800 that can facilitate context based risk assessment of a computer resource vulnerability in accordance with one or more embodiments described herein. Repetitive description of like elements and/or processes employed in respective embodiments is omitted for sake of brevity.

System 800 can comprise an example, non-limiting alternative embodiment of system 600, where system 800 illustrates one or more security measures (e.g., policies, privileges, permissions, specifications, and/or another security measure) that can be implemented with respect to vulnerable pod 506a in a K8s construct. As illustrated in the example embodiment depicted in FIG. 8, one or more security measures that can be implemented in a K8s construct with respect to vulnerable pod 506a can include, but are not limited to: Role-Based Access Control (RBAC); ClusterRole; and/or another security measure. In this example embodiment, the risk associated with vulnerable pod 506a can vary depending on the RBAC designation that can be assigned to vulnerable pod 506a. For example, if vulnerable pod 506a has a "viewer" RBAC designation, then vulnerability risk assessment system 102 can determine that the risk associated with vulnerable pod 506a is less than if vulnerable pod 506a has an "operator" RBAC designation, as an "operator" designation enables vulnerable pod 506a to manipulate (e.g., change, delete, upgrade, and/or another manipulation) one or more computing resource components in system 800 but a "viewer" designation does not.

In accordance with one or more embodiments of the subject disclosure, vulnerability risk assessment system 102 (e.g., via network component 112, check component 202, resource component 204, permissions component 206, risk component 208, and/or another component) can identify and account for such one or more security measures (e.g., RBAC designations, ClusterRole designations, and/or another security measure) when calculating the above described contextual risk score and/or absolute risk score corresponding to vulnerable pod 506a. For example, vulnerability risk assessment system 102 (e.g., via network component 112, check component 202, resource component 204, permissions component 206, risk component 208, and/or another component) can identify and account for vulnerable pod 506a RBAC designations and/or ClusterRole designations when calculating the contextual risk score corresponding to vulnerable pod 506a using Table 1 as described above with reference to the example embodiments depicted in FIGS. 1 and 2.

Figure 9:
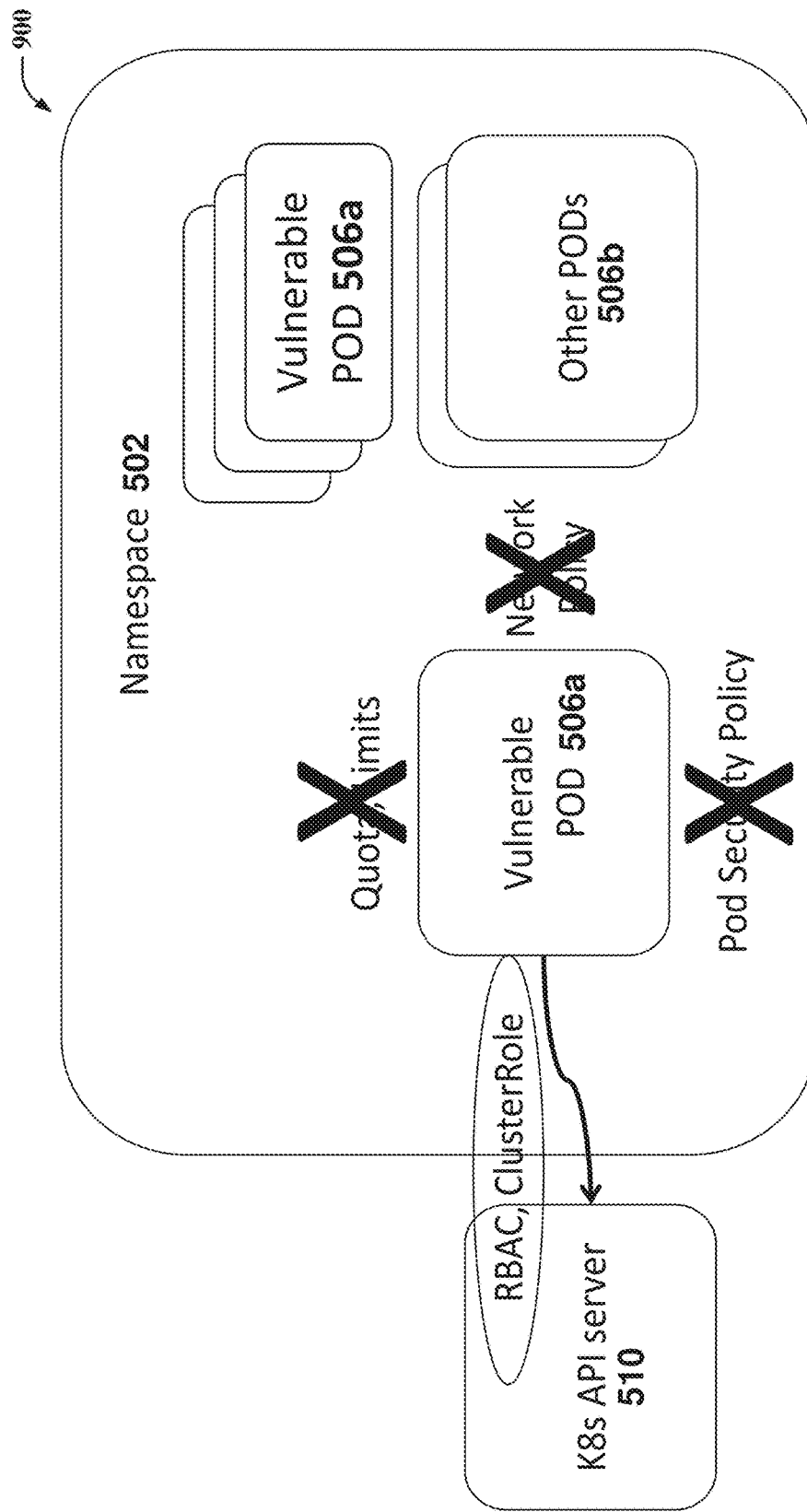

FIG. 9 illustrates a block diagram of an example, non-limiting system 900 that can facilitate context based risk assessment of a computer resource vulnerability in accordance with one or more embodiments described herein. Repetitive description of like elements and/or processes employed in respective embodiments is omitted for sake of brevity.

System 900 can comprise an example, non-limiting alternative embodiment of system 600 and/or system 800, where system 900 illustrates an example of how some security measures can be implemented with respect to vulnerable pod 506a in a K8s construct, while other security measures are not. For instance, in the example embodiment depicted in FIG. 9, RBAC and/or ClusterRole designations can be assigned to vulnerable pod 506a, while Quota, Limits, Network Policy, and/or Pod Security Policy measures are not implemented with respect to vulnerable pod 506a, as denoted by the "X" on each of such security measures in FIG. 9.

As annotated in the example embodiment illustrated in FIG. 9, when certain security measures are not implemented with respect to vulnerable pod 506a (e.g., Quota, Limits, Network Policy, Pod Security Policy, and/or another security measure) it can enable vulnerable pod 506a to morph (e.g., modify, delete, upgrade, and/or another morphing technique) one or more computing resource components of system 900 and/or the system configuration of system 900. In this example embodiment, when such certain security measures are not implemented with respect to vulnerable pod 506a, vulnerability risk assessment system 102 can determine that the risk associated with vulnerable pod 506a is greater than it would be if such certain security measures were implemented. For example, in accordance with one or more embodiments of the subject disclosure, when calculating the above described contextual risk score and/or absolute risk score corresponding to vulnerable pod 506a, vulnerability risk assessment system 102 (e.g., via network component 112, check component 202, resource component 204, permissions component 206, risk component 208, and/or another component) can identify and account for the RBAC and/or ClusterRole designations, as well as the absence of Quota, Limits, Network Policy, and/or Pod Security Policy measures associated with vulnerable pod 506a. For instance, vulnerability risk assessment system 102 (e.g., via network component 112, check component 202, resource component 204, permissions component 206, risk component 208, and/or another component) can identify and account for the RBAC and/or ClusterRole designations, as well as the absence of Quota, Limits, Network Policy, and/or Pod Security Policy measures associated with vulnerable pod 506a when calculating the contextual risk score corresponding to vulnerable pod 506a using Table 1 as described above with reference to the example embodiments depicted in FIGS. 1 and 2.

Figure 10:
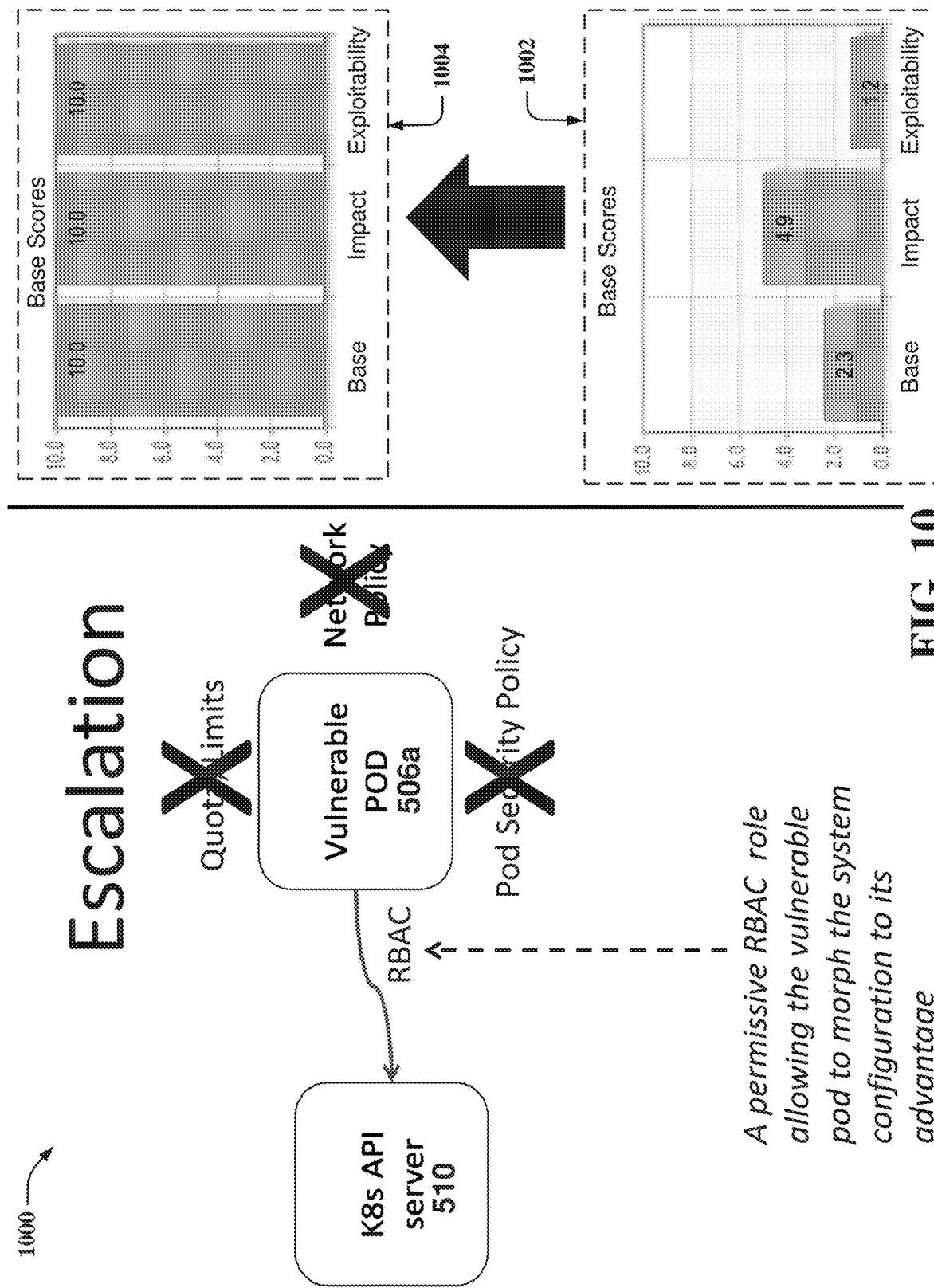

FIG. 10 illustrates an example, non-limiting diagram 1000 that can facilitate context based risk assessment of a computer resource vulnerability in accordance with one or more embodiments described herein. Repetitive description of like elements and/or processes employed in respective embodiments is omitted for sake of brevity.

Diagram 1000 illustrates how the absence of one or more security measures described above with reference to FIG. 9 can escalate the risk associated with vulnerable pod 506a. That is, for example, diagram 1000 illustrates how the risk associated with vulnerable pod 506a (e.g., as defined by the CVE score) can actually be greater when the context associated with vulnerable pod 506a is accounted for in a risk assessment (e.g., accounted for in a contextual based risk assessment that can be performed by vulnerability risk assessment system 102 in accordance with one or more embodiments of the subject disclosure).

In the example embodiment depicted in FIG. 10, base scores 1002 can comprise baseline risk scores such as, for instance, the CVE scores corresponding to the vulnerability of vulnerable pod 506a. For example, base scores 1002 can comprise baseline risk scores that can be calculated without accounting for context associated with vulnerable pod 506a. For instance, base scores 1002 can comprise baseline risk scores that existing vulnerability risk assessment technologies calculate without accounting for context such as, for example, whether or not one or more of the above described security measures have been implemented with respect to vulnerable pod 506a.

In the example embodiment depicted in FIG. 10, base scores 1004 can comprise context based risk scores corresponding to vulnerable pod 506a that do take into account context such as, for example, whether or not one or more of the above described security measures have been implemented with respect to vulnerable pod 506a. In this example embodiment, base scores 1004 can comprise the contextual risk score and/or the absolute risk score corresponding to vulnerable pod 506a that can be calculated by vulnerability risk assessment system 102 (e.g., via risk component 208) as described above with reference to the example embodiments depicted in FIGS. 1 and 2. In this example embodiment, to calculate base scores 1004, vulnerability risk assessment system 102 (e.g., via network component 112, check component 202, resource component 204, permissions component 206, risk component 208, and/or another component) can identify and account for the RBAC designation assigned to vulnerable pod 506a, as well as the absence of Quota, Limits, Network Policy, and/or Pod Security Policy measures associated with vulnerable pod 506a. For instance, vulnerability risk assessment system 102 (e.g., via network component 112, check component 202, resource component 204, permissions component 206, risk component 208, and/or another component) can identify and account for the RBAC designation assigned to vulnerable pod 506a, as well as the absence of Quota, Limits, Network Policy, and/or Pod Security Policy measures associated with vulnerable pod 506a when calculating the contextual risk score corresponding to vulnerable pod 506a using Table 1 as described above with reference to the example embodiments depicted in FIGS. 1 and 2.

In the example embodiment depicted in FIG. 10, it should be appreciated that vulnerability risk assessment system 102 can facilitate an improved risk assessment of vulnerable pod 506a by accounting for context associated with vulnerable pod 506a. For example, it should be appreciated that vulnerability risk assessment system 102 can facilitate an improved risk assessment of vulnerable pod 506a by accounting for one or more security measures that have or have not been implemented with respect to vulnerable pod 506a (e.g., whether or not a Quota, Limits, Network Policy, Pod Security Policy, and/or an RBAC have been implemented with respect to vulnerable pod 506*a* as illustrated in FIG. 10). As illustrated in the example embodiment depicted in FIG. 10, it should be appreciated that base scores 1004 provide a more accurate risk assessment of the risk associated with vulnerable pod 506*a*, as vulnerability risk assessment system 102 can account for the presence of the RBAC designation assigned to vulnerable pod 506*a*, as well as the absence of Quota, Limits, Network Policy, and/or Pod Security Policy measures associated with vulnerable pod 506*a* when calculating base scores 1004.

Figure 11:
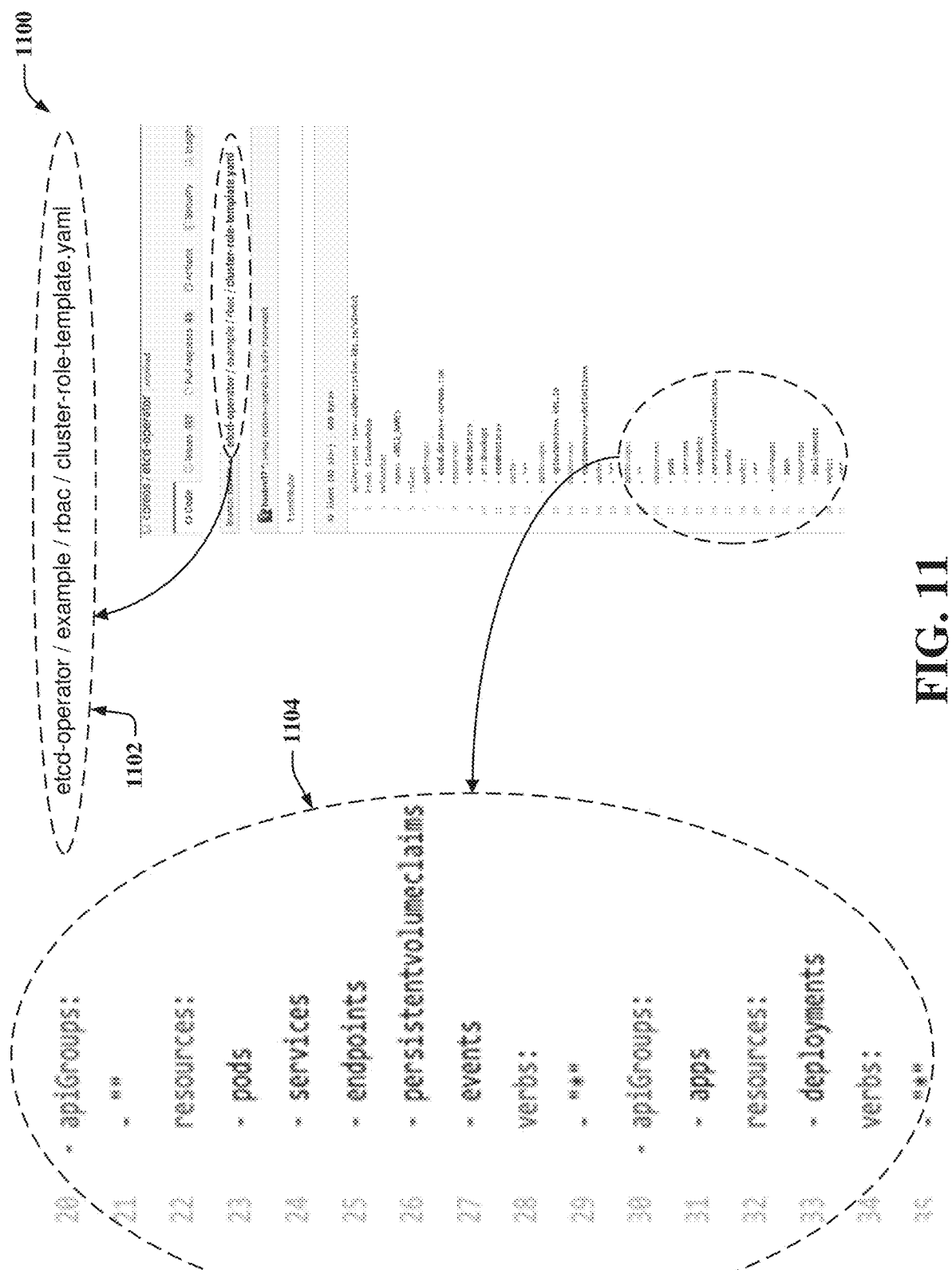

FIG. 11 illustrates an example, non-limiting diagram 1100 that can facilitate context based risk assessment of a computer resource vulnerability in accordance with one or more embodiments described herein. Repetitive description of like elements and/or processes employed in respective embodiments is omitted for sake of brevity.

Diagram 1100 illustrates an etcd-operator 1102 having one or more permissions 1104 that have be defined for etcd operator 1102 before it is deployed. In the example embodiment depicted in FIG. 11, etcd operator 1102 and such one or more permissions 1104 are illustrated in the inset views shown in FIG. 11. In this example embodiment, etcd operator 1102 can comprise a distributed key-value store that can hold and manage certain information to run a distributed system (e.g., system configuration data, state data, metadata, and/or other information), where the name "etcd" derives from a folder named "/etc:" that holds such information and "d" stands for "distributed." In embodiments where vulnerability risk assessment system 102 identifies (e.g., via inspection component 108, namespace component 110, network component 112, and/or another component) a vulnerability corresponding to etcd operator 1102, vulnerability risk assessment system 102 (e.g., via network component 112, check component 202, resource component 204, permissions component 206, risk component 208, and/or another component) can further account for such one or more permissions 1104 defined for etcd operator 1102 when calculating the contextual risk score and/or absolute risk score corresponding to etcd operator 1102 as described above with reference to the example embodiments depicted in FIGS. 1 and 2.

Figure 12:
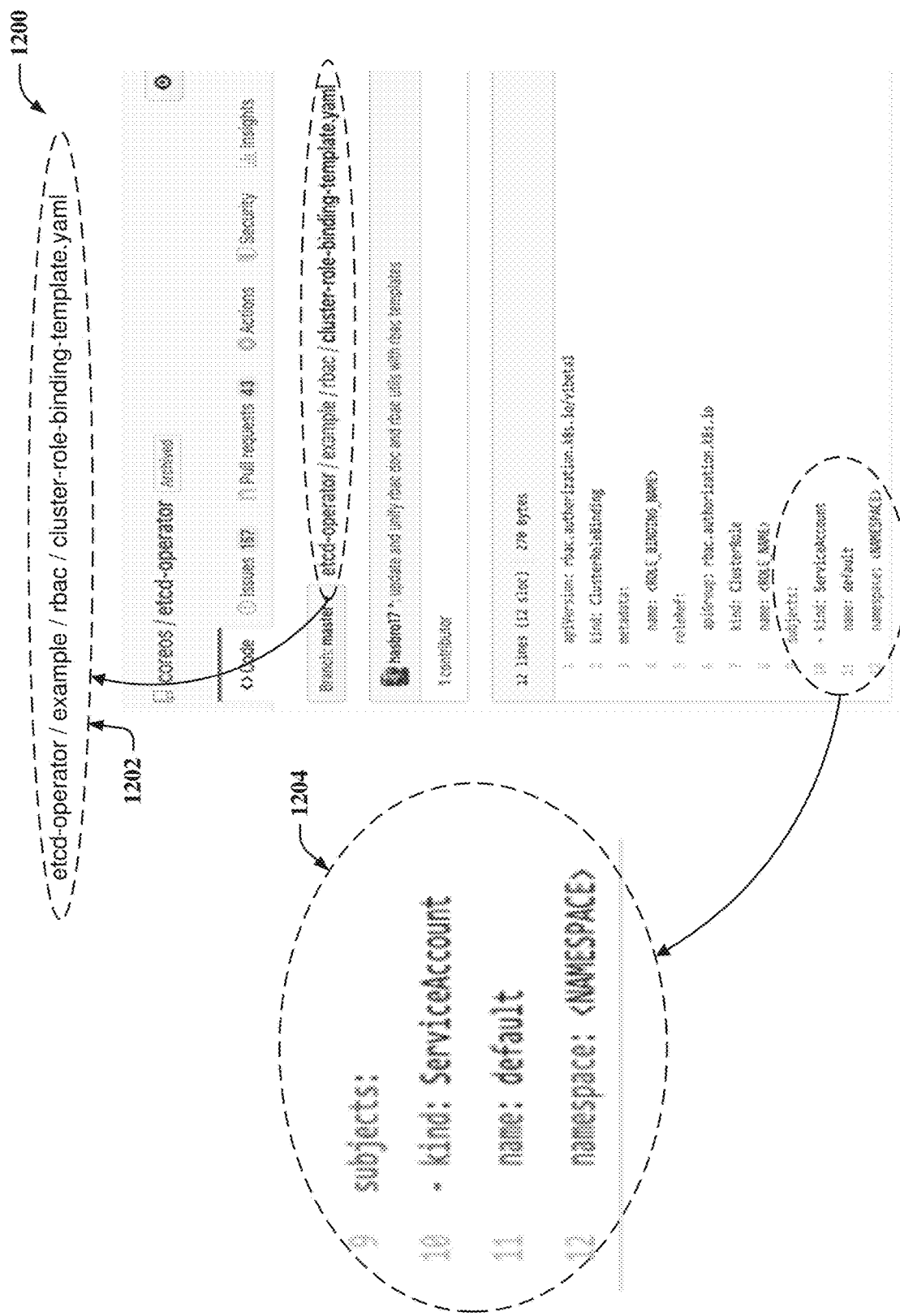

FIG. 12 illustrates an example, non-limiting diagram 1200 that can facilitate context based risk assessment of a computer resource vulnerability in accordance with one or more embodiments described herein. Repetitive description of like elements and/or processes employed in respective embodiments is omitted for sake of brevity.

Diagram 1200 illustrates an etcd-operator 1202 having one or more permissions 1204 that have be defined for etcd operator 1202 before it is deployed. In the example embodiment depicted in FIG. 12, etcd operator 1202 and such one or more permissions 1204 are illustrated in the inset views shown in FIG. 12. In this example embodiment, etcd operator 1202 can comprise a distributed key-value store that can hold and manage certain information to run a distributed system (e.g., system configuration data, state data, metadata, and/or other information), where the name "etcd" derives from a folder named "/etc:" that holds such information and "d" stands for "distributed."

As illustrated in the example embodiment depicted in FIG. 12, such one or more permissions 1204 can specify that etcd operator 1202 can only be run in a certain namespace denoted as "<NAMESPACE>" in FIG. 12 and with a certain account denoted as "ServiceAccount" in FIG. 12. In embodiments where vulnerability risk assessment system 102 identifies (e.g., via inspection component 108, namespace component 110, network component 112, and/or another component) a vulnerability corresponding to etcd operator 1202, vulnerability risk assessment system 102 (e.g., via network component 112, check component 202, resource component 204, permissions component 206, risk component 208, and/or another component) can further account for such one or more permissions 1204 defined for etcd operator 1202 when calculating the contextual risk score and/or absolute risk score corresponding to etcd operator 1202 as described above with reference to the example embodiments depicted in FIGS. 1 and 2.

Figure 13:
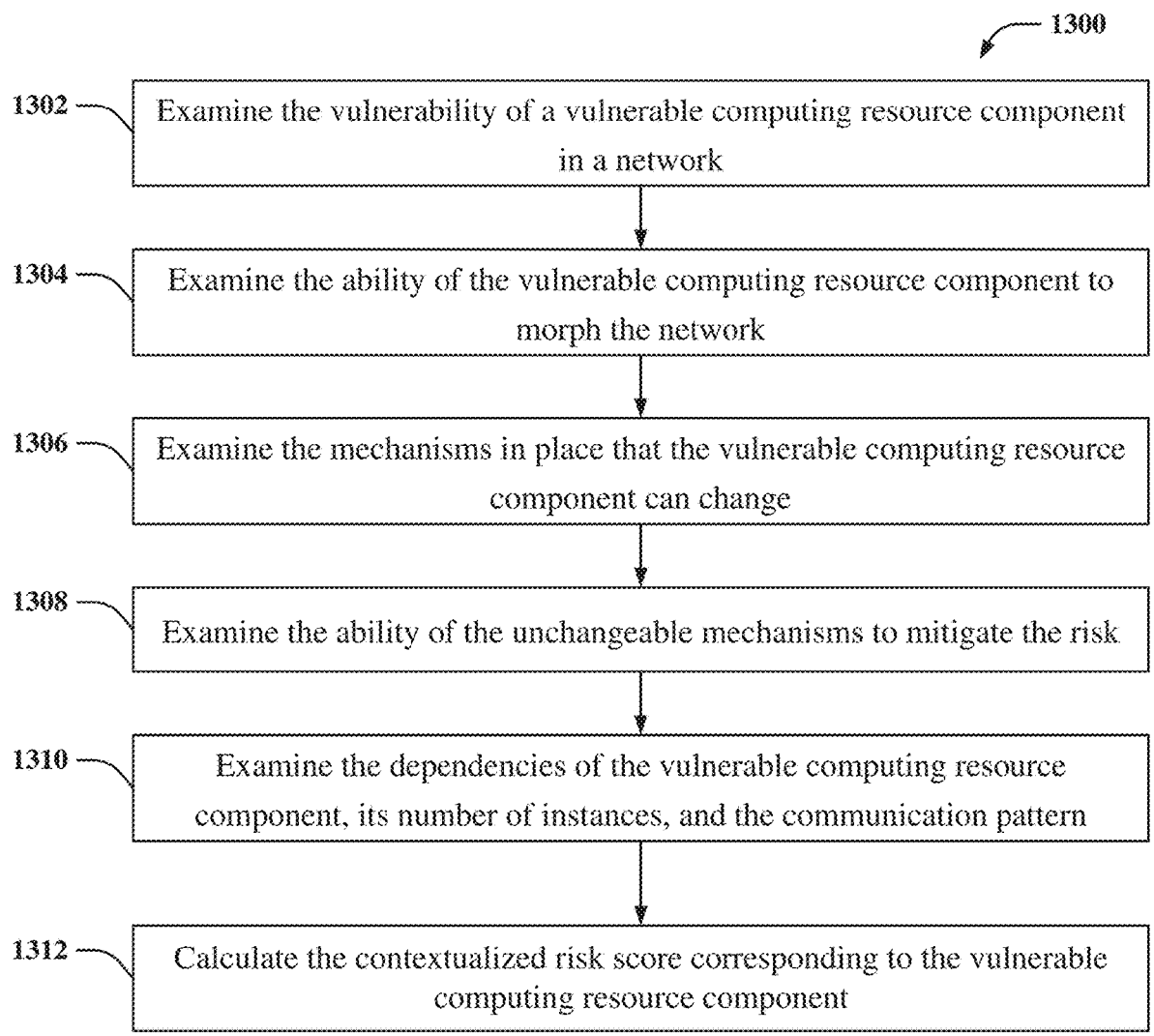
FIGS. 13 and 14 illustrate flow diagrams of example, non-limiting computer-implemented methods that can facilitate context based risk assessment of a computer resource vulnerability in accordance with one or more embodiments described herein.

FIG. 13 illustrates a flow diagram of an example, non-limiting computer-implemented method 1300 that can facilitate context based risk assessment of a computer resource vulnerability in accordance with one or more embodiments described herein. Repetitive description of like elements and/or processes employed in respective embodiments is omitted for sake of brevity.

At 1302, computer-implemented method 1300 can comprise examining (e.g., via vulnerability risk assessment system 102 and/or inspection component 108), using a processor (e.g., processor 106), the vulnerability of a vulnerable computing resource component (e.g., vulnerable pod 506*a*) in a network (e.g., system 500, cloud computing environment 950, and/or another network). For example, for a particular vulnerability, vulnerability risk assessment system 102 and/or inspection component 108 can examine a vulnerability description and/or corresponding CVE score available on the National Vulnerability Database (NVD).

At 1304, computer-implemented method 1300 can comprise examining (e.g., via vulnerability risk assessment system 102, inspection component 108, namespace component 110, network component 112, check component 202, resource component 204, and/or permissions component 206), using the processor (e.g., processor 106), the ability of the vulnerable computing resource component to morph the network (e.g., the ability of the vulnerable computing resource component to morph a configuration of the network). For example, by performing operations 1)-5) described above with reference to the example embodiments illustrated in FIGS. 1 and 2, vulnerability risk assessment system 102 (e.g., via inspection component 108, namespace component 110, network component 112, check component 202, resource component 204, permissions component 206, and/or risk component 208) can contextualize the risk of a vulnerable computing resource component and can further quantify such a risk by calculating the contextual risk score using Table 1 as described above. In this example, by examining the communication path, as well as privileges, permissions, specifications, network policies, and/or other security context settings associated with a vulnerable computing resource component and identifying primary and secondary suspect and/or impacted computing resource components as described above, vulnerability risk assessment system 102 can thereby determine the extent to which the vulnerable computing resource component has ability to, for instance, create, delete, and/or modify one or more features of a network such as, for example, system defense-elements (e.g., Network Policies, Pod Security Policies, Resource Quota, and/or another system defense-element). In this example, the contextual risk score corresponding to such a vulnerable computing resource component (e.g., as calculated at operation 5) by risk component 208) can quantify the overall (e.g., aggregate, comprehensive) ability of the vulnerable computing resource component to morph a network (e.g., a configuration of a network), where, for example, a relatively high contextual risk score can correlate with, for instance, a relatively high ability to morph the network.

At 1306, computer-implemented method 1300 can comprise examining (e.g., via vulnerability risk assessment system 102, inspection component 108, namespace component 110, network component 112, check component 202, resource component 204, and/or permissions component 206), using the processor (e.g., processor 106), the mechanisms in place that the vulnerable computing resource component can change.

At 1308, computer-implemented method 1300 can comprise examining (e.g., via vulnerability risk assessment system 102, inspection component 108, namespace component 110, network component 112, check component 202, resource component 204, and/or permissions component 206), using the processor (e.g., processor 106), the ability of the unchangeable mechanisms to mitigate the risk. For example, by examining the communication path, as well as privileges, permissions, specifications, network policies, and/or other security context settings associated with a vulnerable computing resource component, vulnerability risk assessment system 102 can identify the security context settings that can and cannot be changed by the vulnerable computing resource component. In this example, if, for instance, the vulnerable computing resource component does not have escalated privileges and it is bounded by system policies (e.g., network policies), where such security context settings are unchangeable by the vulnerable computing resource component, then vulnerability risk assessment system 102 can determine that these security context settings are sufficient to mitigate the risk that the vulnerable computing resource may perform certain unauthorized operations.

At 1310, computer-implemented method 1300 can comprise examining (e.g., via vulnerability risk assessment system 102, inspection component 108, namespace component 110, network component 112, check component 202, resource component 204, and/or permissions component 206), using the processor (e.g., processor 106), the dependencies of the vulnerable computing resource component, its number of instances, and the communication pattern.

At 1312, computer-implemented method 1300 can comprise calculating (e.g., via vulnerability risk assessment system 102 and/or risk component 208), using the processor (e.g., processor 106), the contextualized risk score corresponding to the vulnerable computing resource component (e.g., risk component 208 can calculate the contextual risk score using Table 1 as described above with reference to the example embodiments depicted in FIGS. 1 and 2).

Figure 14:
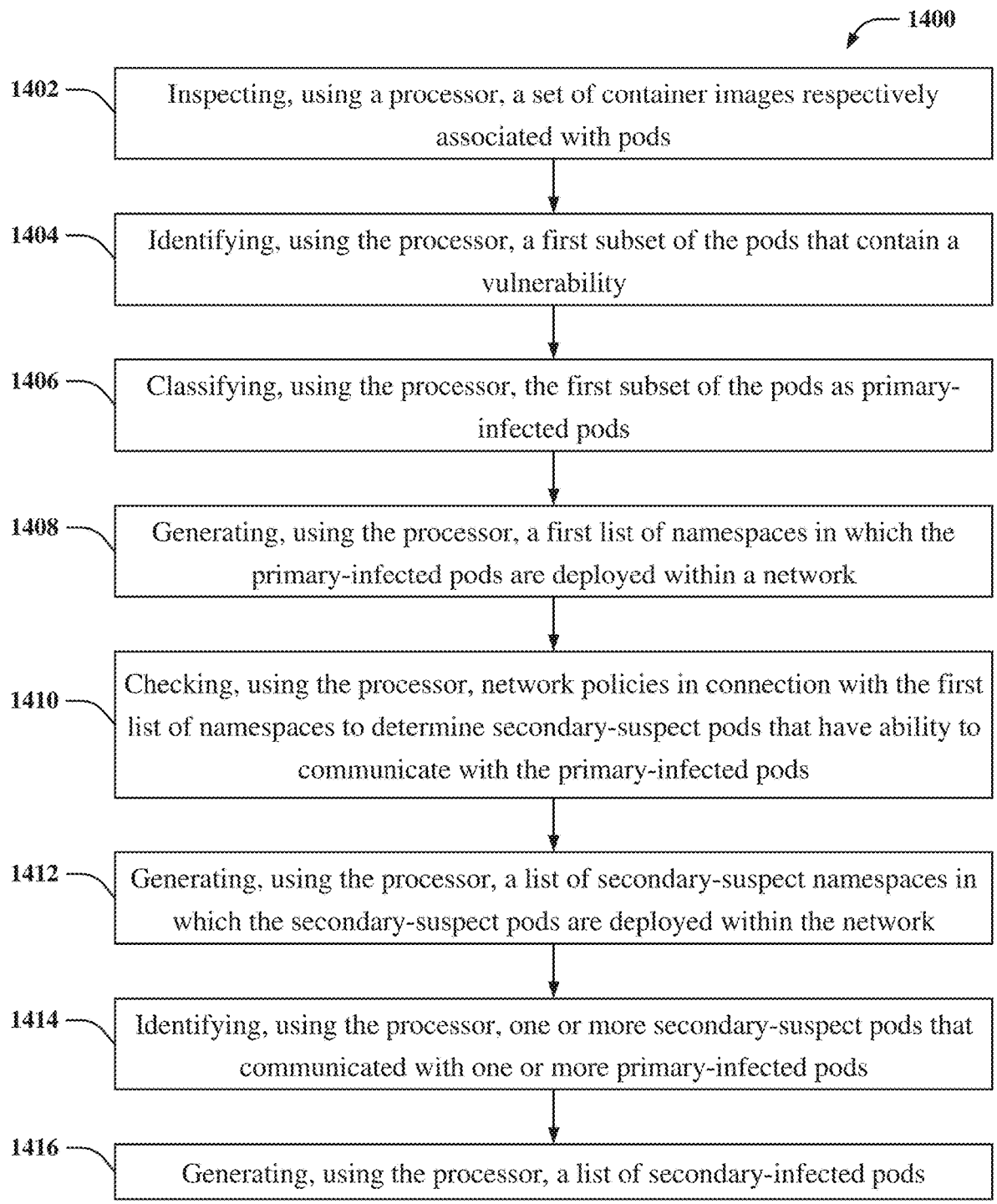

FIG. 14 illustrates a flow diagram of an example, non-limiting computer-implemented method 1400 that can facilitate context based risk assessment of a computer resource vulnerability in accordance with one or more embodiments described herein. Repetitive description of like elements and/or processes employed in respective embodiments is omitted for sake of brevity.

At 1402, computer-implemented method 1400 can comprise inspecting (e.g., via vulnerability risk assessment system 102 and/or inspection component 108), using a processor (e.g., processor 106), a set of container images respectively associated with pods.

At 1404, computer-implemented method 1400 can comprise identifying (e.g., via vulnerability risk assessment system 102 and/or inspection component 108), using the processor (e.g., processor 106), a first subset of the pods that contain a vulnerability.

At 1406, computer-implemented method 1400 can comprise classifying (e.g., via vulnerability risk assessment system 102 and/or inspection component 108), using the processor (e.g., processor 106), the first subset of the pods as primary-infected pods.

At 1408, computer-implemented method 1400 can comprise generating (e.g., via vulnerability risk assessment system 102 and/or namespace component 110), using the processor (e.g., processor 106), a first list of namespaces in which the primary-infected pods are deployed within a network.

At 1410, computer-implemented method 1400 can comprise checking (e.g., via vulnerability risk assessment system 102 and/or network component 112), using the processor (e.g., processor 106), network policies in connection with the first list of namespaces to determine secondary-suspect pods that have ability to communicate with the primary-infected pods.

At 1412, computer-implemented method 1400 can comprise generating (e.g., via vulnerability risk assessment system 102 and/or namespace component 110), using the processor (e.g., processor 106), a list of secondary-suspect namespaces in which the secondary-suspect pods are deployed within the network.

At 1414, computer-implemented method 1400 can comprise identifying (e.g., via vulnerability risk assessment system 102 and/or network component 112), using the processor (e.g., processor 106), one or more secondary-suspect pods that communicated with one or more primary-infected pods.

At 1416, computer-implemented method 1400 can comprise generating (e.g., via vulnerability risk assessment system 102 and/or inspection component 108), using the processor (e.g., processor 106), a list of secondary-infected pods.

Vulnerability risk assessment system 102 can be associated with various technologies. For example, vulnerability risk assessment system 102 can be associated with computing system security and/or risk assessment technologies, ML and/or AI model technologies, cloud computing technologies, and/or other technologies.

Vulnerability risk assessment system 102 can provide technical improvements to systems, devices, components, operational steps, and/or processing steps associated with the various technologies identified above. For example, vulnerability risk assessment system 102 can perform a context based risk assessment of a vulnerable computer resource in a network to more accurately identify and/or quantify the risk(s) associated with the vulnerable computing resource (e.g., more accurately identify and/or quantify the risk(s) when compared to the static CVE score used by current computing system security and/or risk assessment technologies). In this example, by performing such a context based risk assessment of such a vulnerable computing resource, vulnerability risk assessment system 102 can thereby facilitate improved protection of one or more computing resources in the network by enabling a security analyst entity to implement and/or prioritize one or more security measures based on the above described context based risk assessment. In this example, by performing such a context based risk assessment of such a vulnerable computing resource, vulnerability risk assessment system 102 can thereby determine the ability of the vulnerable computing resource to morph a network configuration to its advantage. In this example, such a security analyst entity can then implement and/or prioritize one or more security measures to eliminate or mitigate such ability.

Vulnerability risk assessment system 102 can provide technical improvements to a processing unit associated with vulnerability risk assessment system 102. For example, the one or more computing resources described above can comprise a processor (e.g., a CPU, processor 106, and/or another type of processor). In this example, by performing the above described context based risk assessment that can be used to implement and/or prioritize one or more security measures to protect the one or more computing resources in the network, vulnerability risk assessment system 102 can thereby facilitate improved protection of the processing unit (e.g., improved protection from a potential cyberattack on the processing unit via exploitation of the vulnerable computing resource).

A practical application of vulnerability risk assessment system 102 is that it can be implemented by a security analyst entity to protect one or more computing resources in a network from a cyberattack that can be executed via exploitation of a vulnerable computing resource in the network. For example, practical application of vulnerability risk assessment system 102 is that it can be implemented by a security analyst entity to generate a threat model, a vulnerability management model, and/or a risk management model based on the above described risk assessment of the vulnerable computing resource.

It should be appreciated that vulnerability risk assessment system 102 provides a new approach driven by relatively new cyberattack techniques used to exploit one or more vulnerabilities of one or more computing resources. For example, vulnerability risk assessment system 102 provides a new approach to more accurately identify and/or quantify (e.g., automatically, without input from a human) the risk(s) associated with a vulnerable computing resource (e.g., more accurately identify and/or quantify the risk(s) when compared to the static CVE score used by current computing system security and/or risk assessment technologies).

Vulnerability risk assessment system 102 can employ hardware or software to solve problems that are highly technical in nature, that are not abstract and that cannot be performed as a set of mental acts by a human In some embodiments, one or more of the processes described herein can be performed by one or more specialized computers (e.g., a specialized processing unit, a specialized classical computer, a specialized quantum computer, and/or another type of specialized computer) to execute defined tasks related to the various technologies identified above. Vulnerability risk assessment system 102 and/or components thereof, can be employed to solve new problems that arise through advancements in technologies mentioned above, employment of quantum computing systems, cloud computing systems, computer architecture, and/or another technology.

It is to be appreciated that vulnerability risk assessment system 102 can utilize various combinations of electrical components, mechanical components, and circuitry that cannot be replicated in the mind of a human or performed by a human, as the various operations that can be executed by vulnerability risk assessment system 102 and/or components thereof as described herein are operations that are greater than the capability of a human mind. For instance, the amount of data processed, the speed of processing such data, or the types of data processed by vulnerability risk assessment system 102 over a certain period of time can be greater, faster, or different than the amount, speed, or data type that can be processed by a human mind over the same period of time.

According to several embodiments, vulnerability risk assessment system 102 can also be fully operational towards performing one or more other functions (e.g., fully powered on, fully executed, and/or another function) while also performing the various operations described herein. It should be appreciated that such simultaneous multi-operational execution is beyond the capability of a human mind. It should also be appreciated that vulnerability risk assessment system 102 can include information that is impossible to obtain manually by an entity, such as a human user. For example, the type, amount, and/or variety of information included in vulnerability risk assessment system 102, inspection component 108, namespace component 110, network component 112, check component 202, resource component 204, permissions component 206, and/or risk component 208 can be more complex than information obtained manually by an entity, such as a human user.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 15:
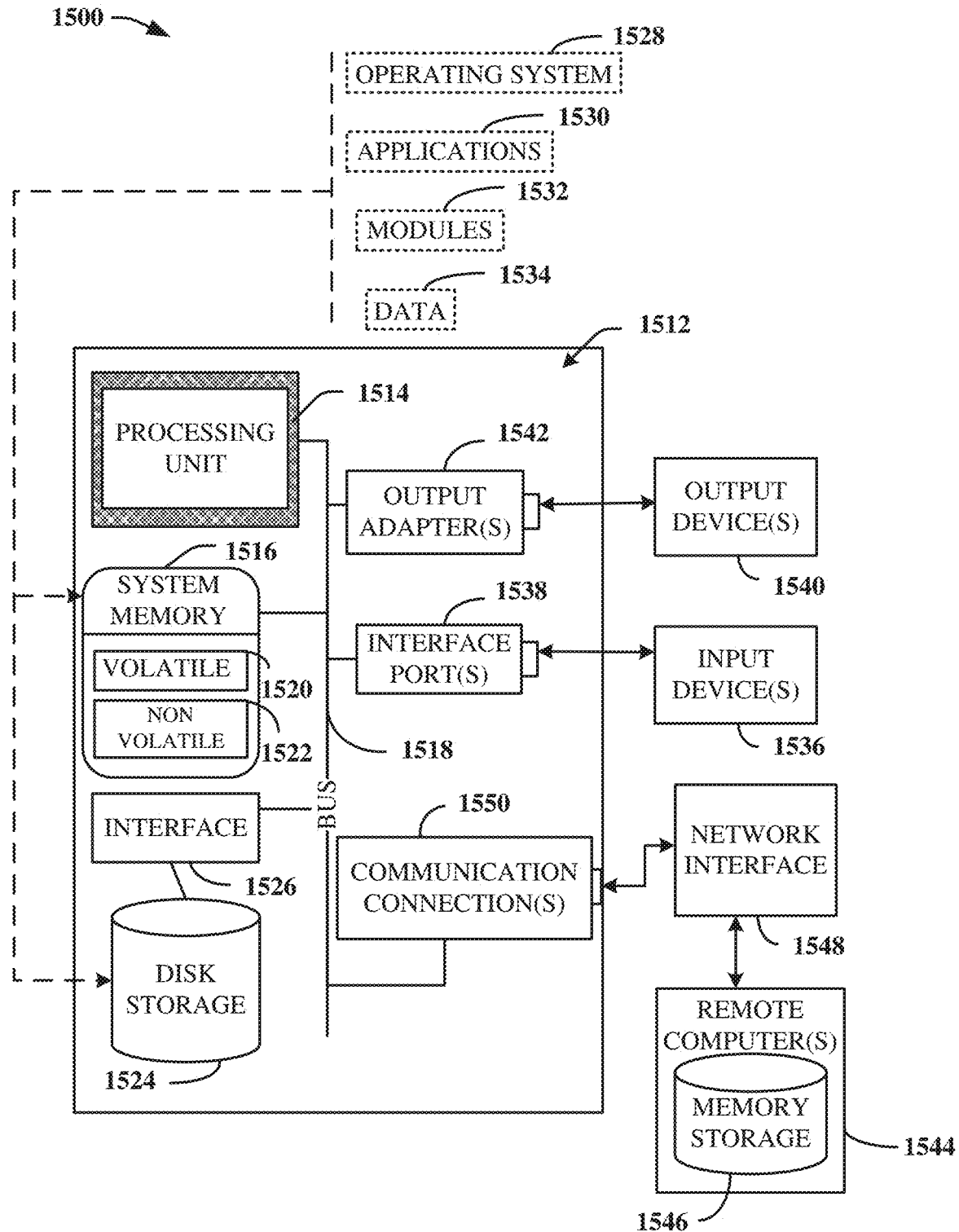
FIG. 15 illustrates a block diagram of an example, non-limiting operating environment in which one or more embodiments described herein can be facilitated.

In order to provide a context for the various aspects of the disclosed subject matter, FIG. 15 as well as the following discussion are intended to provide a general description of a suitable environment in which the various aspects of the disclosed subject matter can be implemented. FIG. 15 illustrates a block diagram of an example, non-limiting operating environment in which one or more embodiments described herein can be facilitated. Repetitive description of like elements employed in other embodiments described herein is omitted for sake of brevity.

With reference to FIG. 15, a suitable operating environment 1500 for implementing various aspects of this disclosure can also include a computer 1512. The computer 1512 can also include a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514. The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1516 can also include volatile memory 1520 and nonvolatile memory 1522. The basic input/output system (BIOS), containing the basic routines to transfer information between elements within the computer 1512, such as during start-up, is stored in nonvolatile memory 1522. Computer 1512 can also include removable/non-removable, volatile/non-volatile computer storage media. FIG. 15 illustrates, for example, a disk storage 1524. Disk storage 1524 can also include, but is not limited to, devices like a magnetic disk drive, floppy disk drive, tape drive, Jaz drive, Zip drive, LS-100 drive, flash memory card, or memory stick. The disk storage 1524 also can include storage media separately or in combination with other storage media. To facilitate connection of the disk storage 1524 to the system bus 1518, a removable or non-removable interface is typically used, such as interface 1526. FIG. 15 also depicts software that acts as an intermediary between users and the basic computer resources described in the suitable operating environment 1500. Such software can also include, for example, an operating system 1528. Operating system 1528, which can be stored on disk storage 1524, acts to control and allocate resources of the computer 1512.

System applications 1530 take advantage of the management of resources by operating system 1528 through program modules 1532 and program data 1534, e.g., stored either in system memory 1516 or on disk storage 1524. It is to be appreciated that this disclosure can be implemented with various operating systems or combinations of operating systems. A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port can be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a computer, a server, a router, a network PC, a workstation, a microprocessor based appliance, a peer device or other common network node and the like, and typically can also include many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses wire and/or wireless communication networks such as local-area networks (LAN), wide-area networks (WAN), cellular networks, and/or another wire and/or wireless communication network. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1550 refers to the hardware/software employed to connect the network interface 1548 to the system bus 1518. While communication connection 1550 is shown for illustrative clarity inside computer 1512, it can also be external to computer 1512. The hardware/software for connection to the network interface 1548 can also include, for exemplary purposes only, internal and external technologies such as, modems including regular telephone grade modems, cable modems and DSL modems, ISDN adapters, and Ethernet cards.

Figure 16:
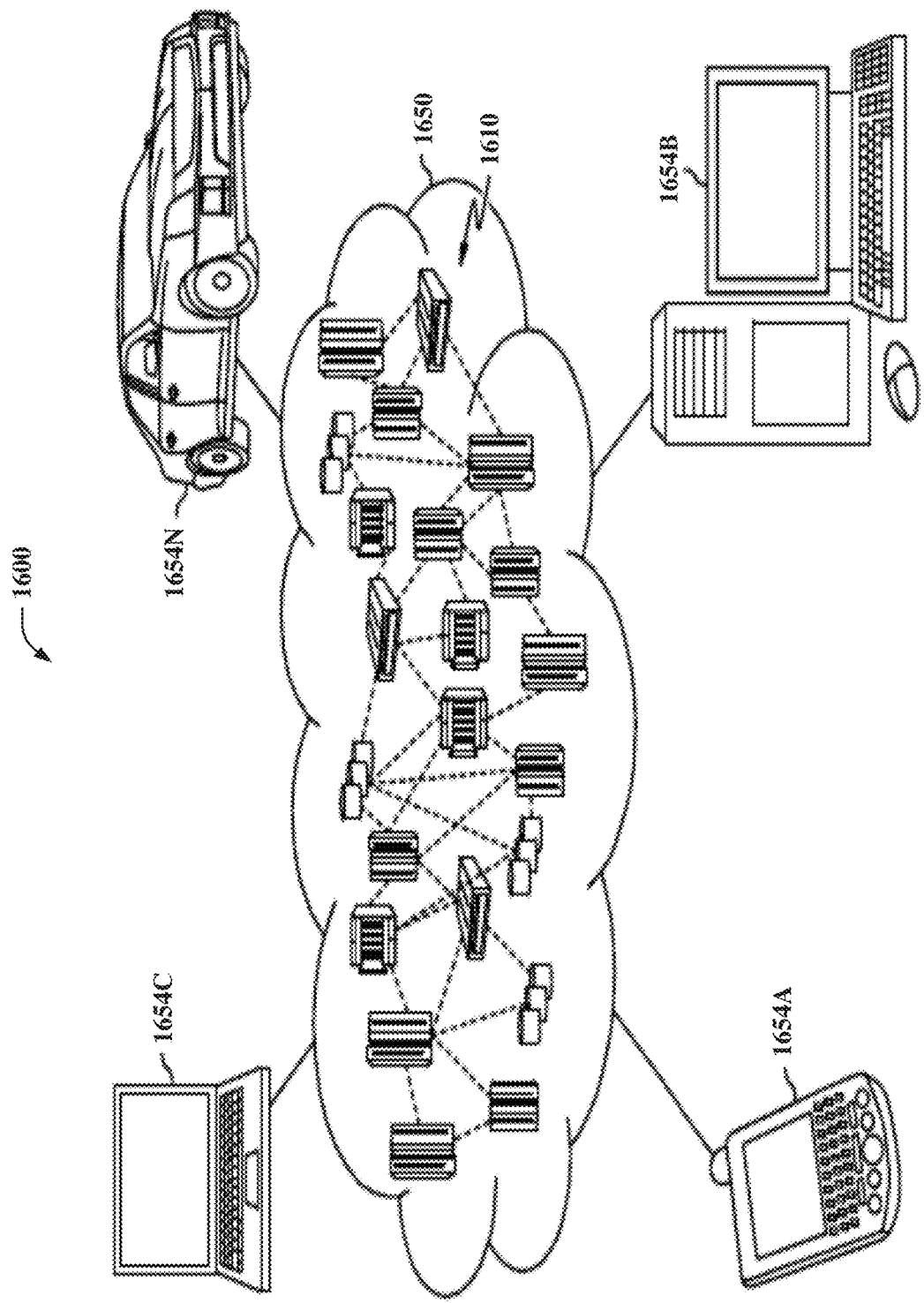
FIG. 16 illustrates a block diagram of an example, non-limiting cloud computing environment in accordance with one or more embodiments of the subject disclosure.

Referring now to FIG. 16, an illustrative cloud computing environment 1650 is depicted. As shown, cloud computing environment 1650 includes one or more cloud computing nodes 1610 with which local computing devices used by cloud consumers, such as, for example, personal digital assistant (PDA) or cellular telephone 1654A, desktop computer 1654B, laptop computer 1654C, and/or automobile computer system 1654N may communicate. Although not illustrated in FIG. 16, cloud computing nodes 1610 can further comprise a quantum platform (e.g., quantum computer, quantum hardware, quantum software, and/or another quantum platform) with which local computing devices used by cloud consumers can communicate. Nodes 1610 may communicate with one another. They may be grouped (not shown) physically or virtually, in one or more networks, such as Private, Community, Public, or Hybrid clouds as described hereinabove, or a combination thereof. This allows cloud computing environment 1650 to offer infrastructure, platforms and/or software as services for which a cloud consumer does not need to maintain resources on a local computing device. It is understood that the types of computing devices 1654A-N shown in FIG. 16 are intended to be illustrative only and that computing nodes 1610 and cloud computing environment 1650 can communicate with any type of computerized device over any type of network and/or network addressable connection (e.g., using a web browser).

Figure 17:
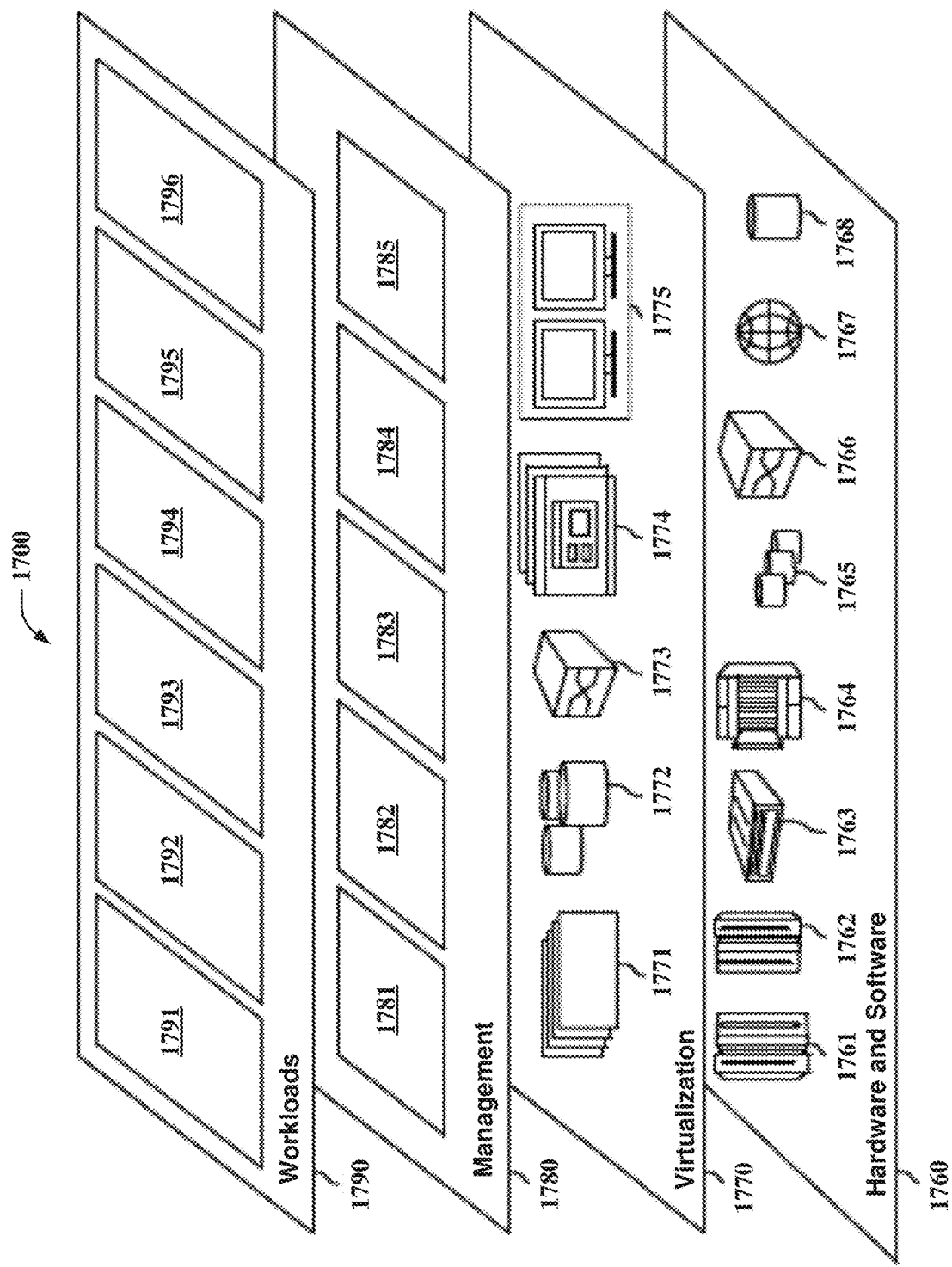
FIG. 17 illustrates a block diagram of example, non-limiting abstraction model layers in accordance with one or more embodiments of the subject disclosure.

Referring now to FIG. 17, a set of functional abstraction layers provided by cloud computing environment 1650 (FIG. 16) is shown. It should be understood in advance that the components, layers, and functions shown in FIG. 17 are intended to be illustrative only and embodiments of the invention are not limited thereto. As depicted, the following layers and corresponding functions are provided:

Hardware and software layer 1760 includes hardware and software components. Examples of hardware components include: mainframes 1761; RISC (Reduced Instruction Set Computer) architecture based servers 1762; servers 1763; blade servers 1764; storage devices 1765; and networks and networking components 1766. In some embodiments, software components include network application server software 1767, database software 1768, quantum platform routing software (not illustrated in FIG. 17), and/or quantum software (not illustrated in FIG. 17).

Virtualization layer 1770 provides an abstraction layer from which the following examples of virtual entities may be provided: virtual servers 1771; virtual storage 1772; virtual networks 1773, including virtual private networks; virtual applications and operating systems 1774; and virtual clients 1775.

In one example, management layer 1780 may provide the functions described below. Resource provisioning 1781 provides dynamic procurement of computing resources and other resources that are utilized to perform tasks within the cloud computing environment. Metering and pricing 1782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1783 provides access to the cloud computing environment for consumers and system administrators. Service level management 1784 provides cloud computing resource allocation and management such that required service levels are met. Service Level Agreement (SLA) planning and fulfillment 1785 provide pre-arrangement for, and procurement of, cloud computing resources for which a future requirement is anticipated in accordance with an SLA.

Workloads layer 1790 provides examples of functionality for which the cloud computing environment may be utilized. Non-limiting examples of workloads and functions which may be provided from this layer include: mapping and navigation 1791; software development and lifecycle management 1792; virtual classroom education delivery 1793; data analytics processing 1794; transaction processing 1795; and vulnerability risk assessment software 1796.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, and/or other program modules that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, handheld computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor that executes the following computer-executable components stored in a non-transitory computer readable medium:
an inspection component that inspects a set of container images respectively associated with pods, identifies a first subset of the pods that contain at least one container image comprising at least one vulnerability, and classifies the first subset of the pods as primary-infected pods;
a namespace component that generates a first list of namespaces in which the primary-infected pods are deployed within a network; and
a network component that:
checks network policies in connection with the first list of namespaces to determine secondary-suspect pods that have ability to communicate with the primary-infected pods,
generates a list of secondary-suspect namespaces in which the secondary-suspect pods are deployed within the network, and
identifies one or more secondary-suspect pods that communicated with one or more primary-infected pods;
wherein the inspection component generates a list of secondary-infected pods based on one or more secondary-suspect pods that communicated with one or more primary-infected pods; and
a risk component that generates a contextual risk score and an absolute risk score associated with the primary-infected pods and the secondary-infected pods, wherein the contextual risk score is based on:
security measures capable of mitigating security risks of container images in the primary-infected pods and the secondary-infected pods based on the at least one vulnerability,
abilities of the container images to change a first subset of the security measures, and
inabilities of the container images to change a second subset of the security measures that are different from the first subset, and
wherein the absolute risk score is based on a risk score determined based on respective vulnerability scores from a knowledge base of the security risks of the container images in the primary-infected pods and the secondary-infected pods, and wherein the risk score is adjusted based on the contextual risk score.

2. The system of claim 1, wherein the risk component determines the contextual risk score further based on checking a specification and privileges associated with the primary-infected pods and the secondary-infected pods to generate a list of suspect machines, primary-infected machines, and secondary-infected machines and to determine an ability of the primary-infected pods and the secondary-infected pods to morph a configuration of the network.

3. The system of claim 1, wherein the risk component determines the contextual risk score further based on determining respective total resource capacities that the container images in the primary-infected pods and the secondary-infected pods have ability to consume to generate a total-capacity-at-risk measure.

4. The system of claim 1, wherein the risk component determines the abilities of the container images to change the first subset of the security measures based on determining respective permissions associated with the container images.

5. The system of claim 3, wherein the total-capacity-at-risk measure is further based on bounded capacity of at least one of: respective processors, respective memory, or respective disks associated with the primary-infected pods and the secondary-infected pods.

6. The system of claim 1, wherein the risk component dynamically generates a second contextual risk score and a second absolute risk score associated with the primary-infected pods and the secondary-infected pods based on one or more changes to at least one of the primary-infected pods and the secondary-infected pods.

7. The system of claim 1, wherein the risk component employs a trained model to dynamically generate the contextual risk score and the absolute risk score associated with the primary-infected pods and the secondary-infected pods.

8. A computer-implemented method, comprising:
inspecting, using a processor, a set of container images respectively associated with pods;
identifying, using the processor, a first subset of the pods that contain at least one container image comprising at least one vulnerability;
classifying, using the processor, the first subset of the pods as primary-infected pods;
generating, using the processor, a first list of namespaces in which the primary-infected pods are deployed within a network;
checking, using the processor, network policies in connection with the first list of namespaces to determine secondary-suspect pods that have ability to communicate with the primary-infected pods;
generating, using the processor, a list of secondary-suspect namespaces in which the secondary-suspect pods are deployed within the network;
identifying, using the processor, one or more secondary-suspect pods that communicated with one or more primary-infected pods;
generating, using the processor, a list of secondary-infected pods based on one or more secondary-suspect pods that communicated with one or more primary-infected pods; and
generating, using the processor, a contextual risk score and an absolute risk score associated with the primary-infected pods and the secondary-infected pods, wherein the contextual risk score is based on:
security measures capable of mitigating security risks of container images in the primary-infected pods and the secondary-infected pods based on the at least one vulnerability,
abilities of the container images to change a first subset of the security measures, and
inabilities of the container images to change a second subset of the security measures that are different from the first subset, and
wherein the absolute risk score is based on a risk score determined based on respective vulnerability scores from a knowledge base of the security risks of the container images in the primary-infected pods and the secondary-infected pods, and wherein the risk score is adjusted based on the contextual risk score.

9. The method of claim 8, further comprising:
checking, using the processor, specification and privileges associated with the primary-infected pods and the secondary-infected pods;
generating, using the processor, a list of suspect machines, primary-infected machines, and secondary-infected machines; and
determining, using the processor, the contextual risk score further based on an ability of the primary-infected pods and the secondary-infected pods to morph a configuration of the network.

10. The method of claim 8, further comprising determining, using the processor, the contextual risk score further based on determining respective total resource capacities that the container images in the primary-infected pods and the secondary-infected pods have ability to consume, and generating a total-capacity-at-risk measure based on the respective total resource capacities the container images in the primary-infected pods and the secondary-infected pods have ability to consume.

11. The method of claim 8, further comprising determining, using the processor, the abilities of the container images to change the first subset of the security measures based on determining respective permissions associated with the the container images.

12. The method of claim 10, wherein the total-capacity-at-risk measure is further based on bounded capacity of at least one of: respective processors, respective memory, or respective disks associated with the primary-infected pods and the secondary-infected pods.

13. The method of claim 8, further comprising generating, using the processor, a second contextual risk score and a second absolute risk score associated with the primary-infected pods and the secondary-infected pods based on one or more changes to at least one of the primary-infected pods and the secondary-infected pods.

14. A computer program product comprising a computer readable storage medium having program instructions embodied therewith, the program instructions executable by a processor to cause the processor to:
inspect a set of container images respectively associated with pods;
identify a first subset of the pods that contain at least one container image comprising at least one vulnerability;
classify the first subset of the pods as primary-infected pods;
generate a first list of namespaces in which the primary-infected pods are deployed within a network;
check network policies in connection with the first list of namespaces to determine secondary-suspect pods that have ability to communicate with the primary-infected pods;
generate a list of secondary-suspect namespaces in which the secondary-suspect pods are deployed within the network;
identify one or more secondary-suspect pods that communicated with one or more primary-infected pods;
generate a list of secondary-infected pods based on one or more secondary-suspect pods that communicated with one or more primary-infected pods; and
generate a contextual risk score and an absolute risk score associated with the primary-infected pods and the secondary-infected pods, wherein the contextual risk score is based on:
security measures capable of mitigating security risks of container images in the primary-infected pods and the secondary-infected pods based on the at least one vulnerability,
abilities of the container images to change a first subset of the security measures, and
inabilities of the container images to change a second subset of the security measures that are different from the first subset, and
wherein the absolute risk score is based on a risk score determined based on respective vulnerability scores from a knowledge base of the security risks of the container images in the primary-infected pods and the secondary-infected pods, and wherein the risk score is adjusted based on the contextual risk score.

15. The computer program product of claim 14, the program instructions further executable by the processor to cause the processor to:
- check specification and privileges associated with the primary-infected pods and the secondary-infected pods;
- generate a list of suspect machines, primary-infected machines, and secondary-infected machines; and
- determine the contextual risk score further based on an ability of the primary-infected pods and the secondary-infected pods to morph a configuration of the network.

16. The computer program product of claim 14, the program instructions further executable by the processor to cause the processor to determine the contextual risk score further based on determining respective total resource capacities that the container images in the primary-infected pods and the secondary-infected pods have ability to consume, and generating a total-capacity-at-risk measure based on the respective total resource capacities the container images in the primary-infected pods and the secondary-infected pods have ability to consume.

17. The computer program product of claim 14, the program instructions further executable by the processor to cause the processor to determine the abilities of the container images to change the first subset of the security measures based on determining respective permissions associated with the container images.

18. The computer program product of claim 14, the program instructions further executable by the processor to cause the processor to generate a second contextual risk score and a second absolute risk score associated with the primary-infected pods and the secondary-infected pods based on one or more changes to at least one of the primary-infected pods and the secondary-infected pods.

19. The computer program product of claim 16, wherein the total-capacity-at-risk measure is further based on bounded capacity of at least one of: respective processors, respective memory, or respective disks associated with the primary-infected pods and the secondary-infected pods.

20. The computer program product of claim 14, wherein the contextual risk score and the absolute risk score are generated using a trained machine learning model.

* * * * *